United States Patent
Ganesan et al.

(10) Patent No.: US 11,588,667 B2
(45) Date of Patent: Feb. 21, 2023

(54) SYMBOL AND TIMING RECOVERY APPARATUS AND RELATED METHODS

(71) Applicant: Texas Instruments Incorporated, Dallas, TX (US)

(72) Inventors: Raghu Ganesan, Bangalore (IN); Saravanakkumar Radhakrishnan, Tamilnadu (IN); Gaurav Aggarwal, Delhi (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/461,575

(22) Filed: Aug. 30, 2021

(65) Prior Publication Data
US 2022/0070031 A1    Mar. 3, 2022

(30) Foreign Application Priority Data
Sep. 2, 2020    (IN)    ............... 202041037775

(51) Int. Cl.
*H04L 25/03* (2006.01)
*H04L 7/00* (2006.01)
*H04L 7/033* (2006.01)

(52) U.S. Cl.
CPC ...... *H04L 25/03057* (2013.01); *H04L 7/0079* (2013.01); *H04L 7/033* (2013.01)

(58) Field of Classification Search
CPC .. H04L 25/03057; H04L 7/0079; H04L 7/033
See application file for complete search history.

(56) References Cited

U.S. PATENT DOCUMENTS

| | | | |
|---|---|---|---|
| 5,757,855 A | 5/1998 | Strolle et al. | |
| 6,366,613 B2 | 4/2002 | Sommer et al. | |
| 7,245,686 B2 | 7/2007 | Weiss et al. | |
| 7,443,914 B2 | 10/2008 | Azenkot et al. | |
| 9,215,107 B1* | 12/2015 | De Bernardinis | .... H04L 7/0062 |
| 9,401,765 B2* | 7/2016 | Kawasoe | ........... H04B 10/6165 |
| 10,382,047 B1* | 8/2019 | Li | ........................ H04L 25/0307 |
| 11,239,991 B2* | 2/2022 | Smith | ................... H04L 7/0062 |
| 11,374,601 B2* | 6/2022 | Ganesan | ............. H04B 1/1036 |
| 11,469,785 B2* | 10/2022 | Ganesan | .............. H04B 1/1607 |
| 2009/0154616 A1* | 6/2009 | Jin | .......................... H04L 27/34 |
| | | | 375/344 |

FOREIGN PATENT DOCUMENTS

GB    2446513 A    8/2008

OTHER PUBLICATIONS

International Search Report in corresponding PCT Application No. PCT/US2021/048597, dated Nov. 11, 2021 (2 pages).

* cited by examiner

*Primary Examiner* — Janice N Tieu
(74) *Attorney, Agent, or Firm* — Valerie M. Davis; Frank D. Cimino

(57) ABSTRACT

An example apparatus includes: a feed forward equalizer (FFE) with a FFE output, adder circuitry with a first adder input, a second adder input, and a first adder output, the first adder input coupled to the FFE output, a multiplexer (MUX) with a first MUX input, a second MUX input, and a MUX output, the first MUX input coupled to the first adder output, the second MUX input coupled to the FFE output, a decision feedback equalizer (DFE) with a DFE output coupled to the second adder input, and a timing error detector (TED) with a first TED input coupled to the MUX output.

17 Claims, 13 Drawing Sheets

SYMBOL AND TIMING RECOVERY APPARATUS AND RELATED METHODS

CROSS-REFERENCE TO RELATED APPLICATION

This patent application claims the benefit of and priority to Indian Patent Application No. 202041037775 filed Sep. 2, 2020, which is incorporated herein by reference in its entirety.

TECHNICAL FIELD

This description relates generally to symbol and timing recovery, and more particularly to symbol and timing recovery apparatus and related methods.

BACKGROUND

Some wireless and wireline receivers, such as Ethernet physical layers (PHYs), carry out symbol and timing recovery techniques to facilitate communication between devices. Some Ethernet PHYs are oversampled systems that use robust clock synchronization techniques to achieve robust timing loop synchronization performance, which is a parameter associated with improved link up times and bit error ratio (BER) performance. Some Ethernet PHYs utilize a one-sample-per-symbol system architecture to reduce cost in terms of area and power. Some such Ethernet PHYs do not have robust timing loop synchronization performance.

SUMMARY

For symbol and timing recovery apparatus and related methods, an example apparatus includes a feed forward equalizer (FFE) with a FFE output, adder circuitry with a first adder input, a second adder input, and a first adder output, the first adder input coupled to the FFE output, a multiplexer (MUX) with a first MUX input, a second MUX input, and a MUX output, the first MUX input coupled to the first adder output, the second MUX input coupled to the FFE output, a decision feedback equalizer (DFE) with a DFE output coupled to the second adder input, and a timing error detector (TED) with a first TED input coupled to the MUX output.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
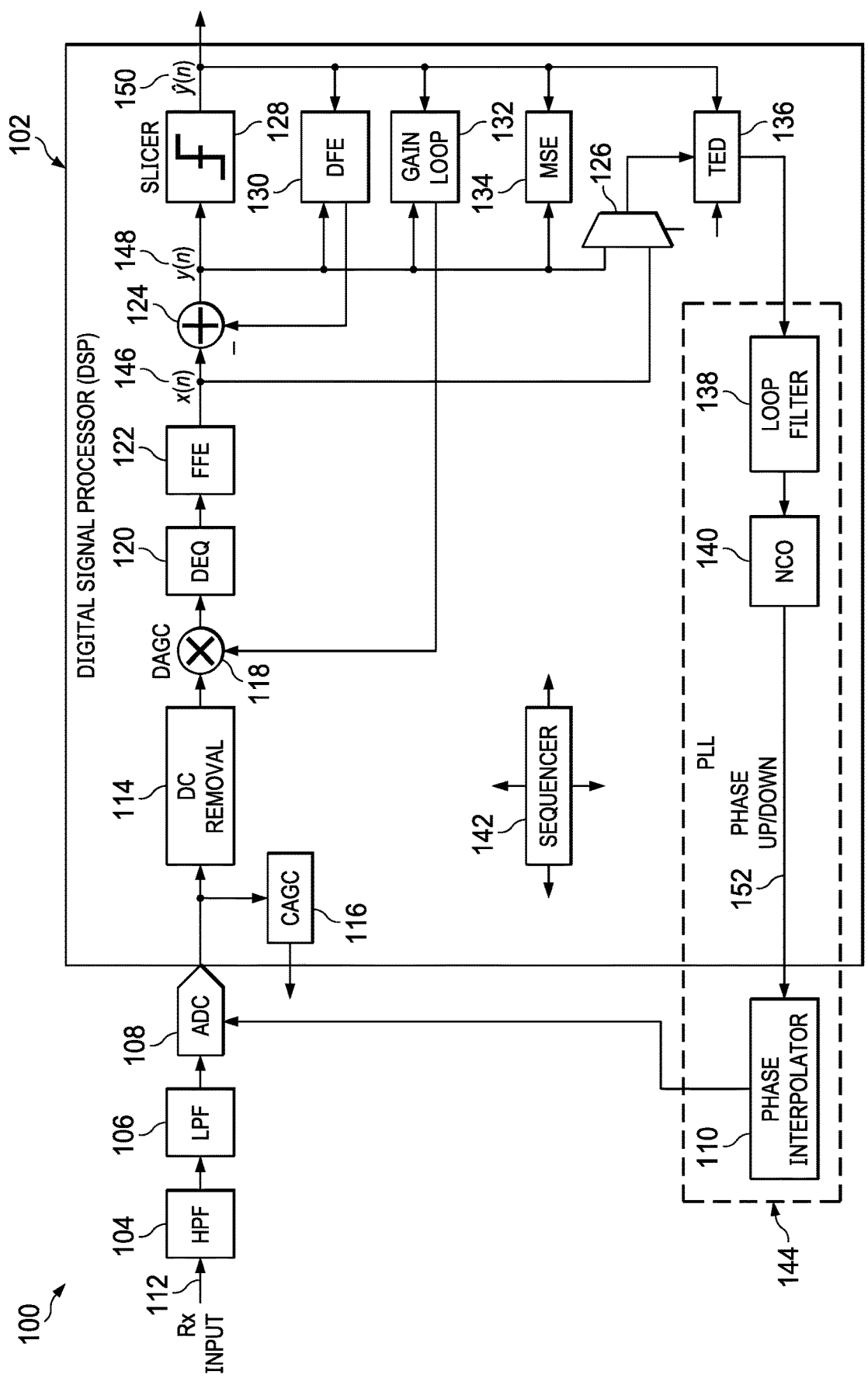
FIG. 1 is a block diagram of an example implementation of a communication system that utilizes a digital signal processor (DSP) that includes a timing error detector (TED) that may implement symbol and timing recovery techniques.

Digital communication systems may utilize modulation techniques, such as pulse amplitude modulation (PAM), to transfer data between devices (such as communication devices). PAM utilizes symbols to achieve the transfer of data. A symbol may refer to a waveform representing one or more bits. For example, a symbol may be one or more pulses of a pulse train, and one(s) of the one or more pulses (i.e., the symbol) may be mapped to one or more bits of data.

Transmitted or received symbols utilized in PAM techniques represent different possible levels based on an amplitude of the transmitted or received pulse(s). Different PAM techniques exist and are specified based on a modulation level identifier (such as PAM3, PAM5, PAM 16, etc.). For example, PAM3 may utilize symbols that represent one of three levels: −1, 0, or +1. In some such examples, a value of −1 is assigned and/or otherwise corresponds to a first amplitude (or voltage), a value of 0 is assigned and/or otherwise corresponds to a second amplitude (or voltage), and a value of +1 is assigned and/or otherwise corresponds to a third amplitude (or voltage). In some such examples, the third amplitude is greater than the second amplitude, and the second amplitude is greater than the first amplitude.

Some digital communication systems may operate based on an Ethernet communication protocol. For example, an Ethernet PHY device is a transceiver that receives and/or transmits data in accordance with an Ethernet communication protocol. Some digital communication systems use a Mueller and Muller (M&M) timing synchronization technique to achieve symbol and timing recovery of received data. For example, a first Ethernet PHY device may transmit data by placing symbols on a communication channel at a fixed and known symbol rate, and a second Ethernet PHY device may receive the data by detecting the sequence of the symbols to reconstruct the transmitted data. The second Ethernet PHY device may reconstruct the transmitted data using the M&M timing synchronization technique.

The M&M technique relies on Inter Symbol Interference (ISI) present at an output of an analog-to-digital converter (ADC) in a digital communication system. ISI is a form of distortion in a signal in which one symbol interferes with subsequent symbol(s). The M&M technique balances the ISI of a post cursor symbol (P+1) and a pre-cursor symbol (P−1) to the same levels to achieve timing synchronization. The M&M technique seeks to achieve timing synchronization to the optimum eye opening point of an eye diagram, which can be generated by a superimposing of different portions of the waveform that represent the different symbols. However, M&M-technique-based digital communication systems achieve lock (such as a loop lock, a timing loop lock, etc.) based on ISI. For communication channels that have low ISI, the M&M-technique based digital communication systems may be subject to unstable link up or substantial periods of time until lock is achieved, which reduce the efficiency and/or performance of such systems.

Examples described herein include communication devices, such as transceivers (such as Ethernet PHY devices), that perform improved symbol and timing recovery techniques. In some described examples, a communication device may perform improved symbol and timing recovery techniques to achieve faster loop locking performance independent of channel length or ISI profile. For example, the communication device may perform a first symbol and timing recovery technique described herein to utilize a PAM symbol transition to determine a timing error. The communication device may use the timing error to generate a timing error signal, which may be incorporated into a timing locked loop for synchronization purposes. In response to the timing error signal, the communication device may adjust a sampling rate, a phase (such as a timing phase), etc., of a clock (such as a clock signal, a sampling clock, etc.) of an ADC of the communication device.

In some described examples, the communication device may perform a second symbol and timing recovery technique to interpolate adjacent samples, which may be used to generate an approximate differentiating sample. As used herein, interpolation refers to constructing new data points based on a range of a discrete set of known data points. For example, the communication device may use transitions between sampled PAM symbols to determine a new sample (such as a differentiator output), which may be used to determine the timing error and corresponding timing error signal. In some such examples, the communication device may identify the transitions as peak symbol point transitions or valley symbol point transitions to achieve the interpolation.

In some described examples, the communication device may perform a third symbol and timing recovery technique to interpolate samples to an intermediate or midpoint value of a sampled PAM symbol to compare with an expected intermediate or midpoint value based on transitions between sampled PAM symbols. For example, the communication device may use transitions between PAM symbols to determine a direction of the timing error and the corresponding timing error signal to achieve the interpolation.

FIG. 1 is a block diagram of an example communication system (such as a digital communication system) 100 including an example digital signal processor (DSP) 102. In some examples, the DSP 102, and/or, more generally, the communication system 100, may be an Ethernet PHY device. The communication system 100 includes an example high-pass filter (HPF) 104, an example low-pass filter (LPF) 106, an example analog-to-digital converter (ADC) 108, and example phase interpolator circuitry 110. In some examples, the LPF 106 may be an amplifier such as a programmable-gain amplifier or a variable-gain amplifier. The HPF 104 is coupled to a communication channel (e.g., an Ethernet cable) to receive an example receive (RX) input 112. For example, the RX input 112 may be an analog communication signal based on an Ethernet communication protocol.

The DSP 102 includes example DC removal circuitry 114 (e.g., for direct-current voltage and/or direct-current current removal), an example coded automatic gain controller (CAGC) 116, an example digital automatic gain controller (DAGC) 118, an example de-equalizer (identified by DEQ) (such as de-equalizer circuitry) 120, an example feed forward equalizer (FFE) 122, example adder circuitry 124, an example multiplexer 126, example slicer circuitry (such as data slicer circuitry) 128, an example decision feedback equalizer (DFE) 130, example gain loop circuitry 132, example mean-square error circuitry 134, an example timing error detector (TED) (such as TED circuitry) 136, an example loop filter 138, an example numerically-controlled oscillator (NCO) 140, and example sequencer circuitry 142. Alternatively, the DSP 102 may include fewer or more hardware components than depicted in the example of FIG. 1. For example, although the HPF 104, the LPF 106, the ADC 108, and the phase interpolator circuitry 110 are depicted as separate from the DSP 102, in some examples, at least one of the HPF 104, the LPF 106, the ADC 108, or the phase interpolator circuitry 110 may be included in the DSP 102. In this example, the DSP 102, and/or, more generally, the communication system 100, effectuates a phase-locked loop (PLL) (such as phase-locked loop circuitry) 144. The PLL 144 includes the phase interpolator circuitry 110, the loop filter 138, and the NCO 140. Alternatively, the PLL 144 may include fewer or more hardware components than depicted in the example of FIG. 1.

In the illustrated example of FIG. 1, input(s) of the HPF 104 is/are coupled to terminal(s), which is/are adapted to receive the RX input 112. Output(s) of the HPF 104 is/are coupled to input(s) of the LPF 106. Output(s) of the LPF 106 is/are coupled to input(s) (such as an ADC input) of the ADC 108. Output(s) (such as an ADC output) of the ADC 108 is/are coupled to input(s) of the DC removal circuitry 114, input(s) of the CAGC 116, and/or, more generally, input(s) of the DSP 102. Output(s) of the CAGC 116 is/are coupled to circuitry external to the DSP 102. Output(s) of the DC removal circuitry 114 is/are coupled to input(s) of the DAGC 118. Output(s) of the DAGC 118 is/are coupled to input(s) of the DEQ 120. Output(s) of the DEQ 120 is/are coupled to input(s) (such as an FFE input) of the FFE 122. Output(s) (such as an FFE output) of the FFE 122 is/are coupled to input(s) (such as an adder input, an adder circuitry input, etc.) of the adder circuitry 124 and a second input of the multiplexer 126. Output(s) (such as an adder output, an adder circuitry output, etc.) of the adder circuitry 124 is/are coupled to a first input of the multiplexer 126, input(s) of the slicer circuitry 128, input(s) of the DFE 130, input(s) of the gain loop circuitry 132, and input(s) of the MSE 134 circuitry. Output(s) of the multiplexer 126 is/are coupled to input(s) (such as a TED input) of the TED 136. Alternatively, the DSP 102 may not include the multiplexer 126. For example, output(s) of the FFE 122 and/or the adder circuitry 124 may be coupled to input(s) of the TED 136.

Output(s) (such as a slicer output) of the slicer circuitry 128 is/are coupled to circuitry external to the DSP 102. For example, output(s) of the slicer circuitry 128 may be coupled to memory (and/or a memory controller) to store decisions (such as data slice decisions) in memory, which may be accessed by one or more processors. Output(s) of the slicer circuitry 128 is/are coupled to input(s) (such as a DFE input) of the DFE 130, the gain loop circuitry 132, the MSE circuitry 134, and the TED 136. Output(s) (such as a DFE output) of the DFE 130 is/are coupled to input(s) of the adder circuitry 124. Output(s) of the gain loop circuitry 132 is/are coupled to input(s) of the DAGC 118. Output(s) (such as a TED output) of the TED 136 is/are coupled to input(s) (such as a loop filter input) of the loop filter 138, and/or, more generally, input(s) (such as a PLL input) of the PLL 144. Output(s) (such as a loop filter output) of the loop filter 138 is/are coupled to input(s) (such as an NCO input) of the NCO 140. Output(s) (such as an NCO output) of the NCO 140 is/are coupled to input(s) (such as a phase detector input, a phase interpolator input, etc.) of the phase interpolator circuitry 110. Output(s) (such as a phase detector output, a phase interpolator output, etc.) of the phase interpolator circuitry 110, and/or, more generally, output(s) (such as a PLL output) of the PLL 144 is/are coupled to input(s) of the ADC 108.

The DSP 102, and/or, more generally, the communication system 100, may perform example symbol and timing recovery techniques as described herein. In example operation, the HPF 104 (which may, for example, be implemented as a digital filter or an analog filter) receives and/or otherwise obtains the RX input 112. For example, the HPF 104 may receive the RX input 112 from another device (such as a communication device, an Ethernet PHY device, etc.). The HPF 104 attenuates frequencies of the RX input 112 that are lower than a first cutoff frequency of the HPF 104. The HPF 104 passes frequencies of the RX input 112 that are higher than the first cutoff frequency to the LPF 106 (which may, for example, be implemented as a digital filter or an analog filter). The LPF 106 attenuates frequencies of the RX input 112 that are greater than a second cutoff frequency of the LPF 106 and passes frequencies of the RX input 112 that are lower than the second cutoff frequency to the ADC 108. In an alternative embodiment, an RF sampling ADC (such as by delay-based ADC) may be connected directly to the RX input 112 and the filtering may be accomplished using digital filters after the conversion of RX input 112 from analog to digital. The ADC 108 converts the filtered RX input 112 into a digital signal. In this example, the ADC 108 samples the RX input 112 at a sampling rate of approximately one sample per second (such as sampling one symbol per sample). Alternatively, the ADC 108 may sample the RX input 112 at any other sampling rate. The CAGC 116 amplifies the digital signal to output an amplified digital signal. For example, the CAGC 116 may determine the power of the digitized signal and accordingly adjust the analog gain (e.g., by altering the attenuation or gain of HPF 104 or LPF 106) to bring the digitized signal to a desired level at the input of the ADC 108 to increase and/or otherwise maximize a signal-to-noise ratio (SNR). The DC removal circuitry 114 may be one or more filters to remove the DC bias from the output of the ADC 108. The DAGC 118 may generate an output to the DEQ 120 based on a multiplication (or product) of the output from the DC removal circuitry 114 and the output from the gain loop circuitry 132. For example, the DAGC 118 may amplify the digital signal to a pre-determined level at an input of the slicer circuitry 128. The DEQ 120 may include one or more filters to filter the output from the DAGC 118.

In example operation, the FFE 122 equalizes the communication channel of the communication system 100. The FFE 122 recovers the data from the RX input 112. For example, the FFE 122 may generate a first example symbol 146 (identified by x(n)) based on the output from the DEQ 120. The adder circuitry 124 may generate a second example symbol 148 (identified by y(n)) based on a difference of the first symbol 146 and a value of the output of the DFE 130. For example, the FFE 122 may generate the first symbol 146 as an uncorrected symbol and the adder circuitry 124 may generate the second symbol 148 as a corrected symbol.

In example operation, the DFE 130 may predict, identify, and/or otherwise determine a noise level of the communication channel based on previous samples (such as previous values of the first symbol 146 and/or the second symbol 148). For example, the DFE 130 may output a noise error (such as a noise error signal) to the adder circuitry 124 to correct the second symbol 148 and thereby generate DFE corrected symbols. Advantageously, the adder circuitry 124 may subtract the predicted noise level, which is output from the DFE 130, from the first symbol 146. The slicer circuitry 128 performs slicing on the second symbol 148 using one or more thresholds (such as one or more threshold values). For example, the slicer circuitry 128 may generate a first output (also referred to as a decision, a data decision, a symbol decision, etc.) in response to a determination that an amplitude of the second symbol 148 is greater than a first threshold, a second output in response to a determination that the amplitude is greater than a second threshold, etc. In some such examples, the slicer circuitry 128 may generate a third example symbol 150 (ŷ(n)) based on the determination(s). For example, the slicer circuitry 128 may generate the third symbol 150 as having one of the PAM levels (such as a level of −1, 0, +1 for PAM3).

In example operation, the gain loop circuitry 132 may output a gain (such as a voltage, a signal, etc., representative of a gain value) to the DAGC 118 to adjust and/or otherwise modify the input to the DEQ 120. For example, the gain loop circuitry 132 may output the gain based on the second symbol 148 and/or the third symbol 150. The MSE circuitry 134 may output a MSE (such as a voltage, a signal, etc., representative of an MSE). For example, the MSE circuitry 134 may determine a difference between an input to the slicer circuitry 128 and an output of the slicer circuitry 128 to determine a noise associated with the DSP 102, such as noise of the communication channel processed by the DSP 102. In some such examples, the MSE circuitry 134 may determine if a desired SNR of the input of the slicer circuitry 128 satisfies a threshold (such as an SNR threshold, a noise energy threshold, etc.). For example, in response to the SNR of the input of the slicer circuitry 128 being less than the threshold, the sequencer circuitry 142 may proceed to a subsequent state. In some examples, in response to the SNR of the input of the slicer circuitry 128 being greater than the threshold, the sequencer circuitry 142 may revert back to a previous state to achieve a re-convergence of the timing lock. In some examples, the threshold may be user defined (such as by being pre-programmed, configured, etc., prior to the DSP 102 processing the communication channel). In some examples, the threshold may be dynamically adjusted by the sequencer circuitry 142. For example, the sequencer circuitry 142 may adjust the threshold based on a historical SNR of the DSP (such as an SNR of the DSP 102 over one or more previous clock cycles).

In example operation, the multiplexer 126 selects whether to output the first symbol 146 or the second symbol 148 to the TED 136. In some examples, an input (such as a control or select input) of the multiplexer 126 is coupled to an output (such as a sequencer output) of the sequencer circuitry 142. In some examples, the sequencer circuitry 142 may be logic circuitry, machine readable instructions, hardware implemented state machines, processing circuitry, and/or any other combination thereof. For example, the sequencer circuitry 142 may be one or more analog and/or digital circuits. In some examples, the sequencer circuitry 142 may instruct the multiplexer 126 to select the first symbol 146 in response to a determination that the PLL 144 did not achieve a timing lock. In some examples, the sequencer circuitry 142 may instruct the multiplexer 126 to select the second symbol 148 in response to a determination that the PLL 144 achieved a timing lock (such as a timing loop lock). In some examples, the TED 136 may determine a first timing error based on an uncorrected symbol (such as the first symbol 146) prior to the PLL 144 achieving a timing lock and a second timing error based on a corrected symbol (such as the second symbol 148) in response to the PLL 144 achieving a timing lock. Advantageously, after the PLL 144 achieves a timing lock, the outputs from the DFE 130 converge to a steady-state or stable value. In response to the converging of the outputs of the DFE 130, the TED 136 may be switched to use the DFE corrected symbols (or partially corrected DFE symbols) for improved noise variance (such as lower noise variance).

In example operation, the TED 136 outputs a timing error (such as a voltage, a timing error signal, etc.) based on the first symbol 146, the second symbol 148, and/or the third symbol 150. For example, the TED 136 may output the timing error by utilizing one or more symbol(s) and timing recovery techniques as described herein. In some examples, an input (such as a control input, a select input, etc.) of the TED 136 is coupled to an output of the sequencer circuitry 142. For example, the sequence circuitry 142 may instruct the TED 136 to use the first symbol 146, the second symbol 148, and/or the third symbol 150 to generate the timing error. The loop filter 138 may filter the timing error and provide the filtered timing error to the NCO 140.

In some examples, the NCO 140 may be an accumulator (such as a digital phase accumulator). For example, the accumulator may increment or decrement an accumulator value from an initial value (such as 0 or a zero value) and generate an example control signal 152 (identified by PHASE UP/DOWN) in response to the accumulator value satisfying a threshold. In some examples, the NCO 140 may generate the control signal 152 to either increase a phase or decrease the phase of a clock at which the ADC 108 samples the RX input 112. In some examples, the phase interpolator circuitry 110 may be a phase detector. For example, the phase interpolator circuitry 110 may detect a phase of the control signal 152, and instruct the ADC 108 to increase a phase of a clock, which may be part of the ADC 108, based on the detected phase of the control signal 152. In some examples, the phase interpolator circuitry 110 may instruct the ADC 108 to decrease a phase of the clock based on the control signal 152.

Figure 2:
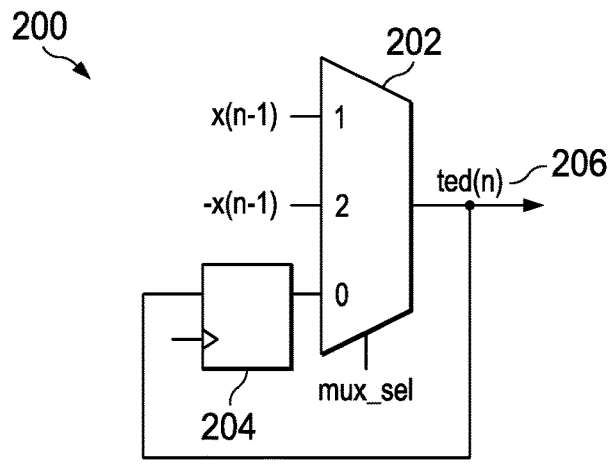
FIG. 2 is a block diagram of an example implementation of the TED of FIG. 1.

FIG. 2 is a block diagram of an example TED 200. In some examples, the TED 200 may implement the TED 136 of FIG. 1. The TED 200 includes an example multiplexer 202 and an example latch 204. The latch 204 is a D flip-flop. Alternatively, the latch 204 may be a Set-Reset (SR) flip-flop, a JK flip-flop, or a T flip-flop. In some examples, a first input (identified by x(n−1)) and a second input (identified by −x(n−1)) of the multiplexer 202 may be coupled to an output (such as a multiplexer output, a MUX output, etc.) of the multiplexer 126 of FIG. 1. For example, x(n−1) and −x(n−1) may be previous symbols. In some such examples, x(n−1) may be a previous value of the first symbol 146, a previous value of the second symbol 148, etc., of FIG. 1. A third input (such as a multiplexer input, a MUX input, etc.) of the multiplexer 202 is coupled to an output (such as a latch output) of the latch 204 so that an input of the multiplexer 202 may be a previous output of multiplexer 202. In some examples, a control or select input (such as a MUX control input) (identified by mux_sel) of the multiplexer 202 is coupled to an output of the sequencer circuitry 142 of FIG. 1. An output of the multiplexer 202 is coupled to an input (such as a latch input) of the latch. The clock input of the latch 204 may be adapted to receive a clock signal, which may be output from the sequencer circuitry 142 of FIG. 1. An output of the multiplexer 202 (identified by ted(n)) is coupled to the input(s) of the loop filter 138, and/or, more generally, the input(s) of the PLL 144 of FIG. 1.

In example operation, the TED 200 outputs a "0" as an example timing error 206 (identified by ted(n)) when the TED 200 does not detect a timing error. If the TED 200 detects a timing error, then the TED 200 outputs the timing error 206 to cause the ADC 108 to sample either left or right of the desired sampling point. Accordingly, the TED 200 outputs the timing error 206 with a direction (such as whether to sample to the left or the right of the desired sampling point).

The TED 200 of the illustrated example may perform one or more symbol and timing recovery techniques to generate the timing error 206. For example, the timing error 206 may represent a time difference between a previously detected symbol and a current detected symbol. The TED 200 instructs the multiplexer 202 to select 1 when a −1, 0, +1 symbol transition (such as $\hat{y}(n-2)=-1$, $\hat{y}(n-1)=0$, $\hat{y}(n)=+1$) of the RX input 112 is detected. For example, the multiplexer 202 may output a positive value of the previously detected symbol. The TED 200 may instruct the multiplexer 202 to select 2 when a +1, 0, −1 symbol transition (such as $\hat{y}(n-2)=+1$, $\hat{y}(n-1)=0$, $\hat{y}(n)=-1$) of the RX input 112 is detected. For example, the multiplexer 202 may output a negative value of the previously detected symbol. The TED 200 may instruct the multiplexer 202 to select 0 otherwise. Alternatively, the TED 200 may control the multiplexer 202 using any other logic than depicted in the example of FIG. 2.

Figure 3:
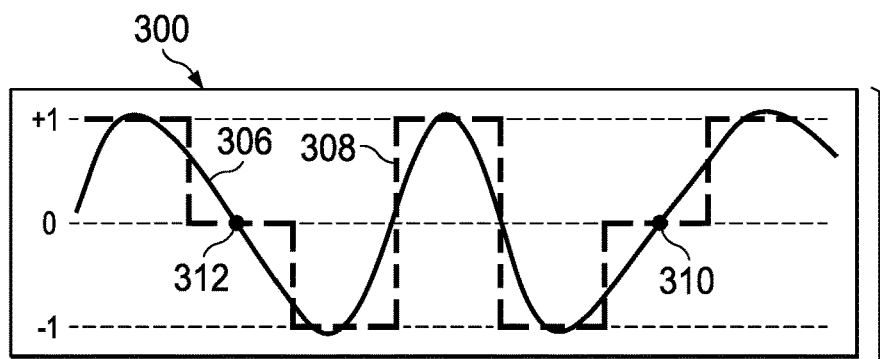
FIG. 3 is a first timing diagram and example pseudocode that may be carried out by the DSP of FIG. 1 and/or the TED of FIGS. 1 and/or 2 to execute a first example symbol and timing recovery technique.

FIG. 3 depicts a first timing diagram 300 corresponding to example operation of the TED 200 of FIG. 2, the TED 136 of FIG. 1, and/or, more generally, the DSP 102 of FIG. 1. Further depicted in FIG. 3 is first example pseudocode 302 and second example pseudocode 304 that may be performed by the TED 200 of FIG. 2, the TED 136 of FIG. 1, and/or, more generally, the DSP 102 of FIG. 1. In some examples, the first pseudocode 302 and/or the second pseudocode 304 may be implemented by the DSP 102 to carry out a first symbol and timing recovery technique. For example, the first symbol and timing recovery technique may be a constellation-based TED technique.

The first timing diagram 300 includes an example analog signal waveform 306 and an example pulse waveform 308. In some examples, the analog signal waveform 306 may be the RX input 112 of FIG. 1. In some examples, the pulse waveform 308 may be the output of the slicer circuitry 128 of FIG. 1. For example, the pulse waveform 308 may be symbols generated by the slicer circuitry 128 (such as the third symbol 150 of FIG. 1).

In example operation, the TED 136 of FIG. 1 and/or the TED 200 of FIG. 2 may implement the first pseudocode 302 to determine a timing error (ted(n)). For example, the sequencer circuitry 142 may determine that a current decision (such as a current slicer decision, ŷ(n)) of the slicer circuitry 128 of FIG. 1 is +1, a first previous slicer decision (ŷ(n−1)) is 0, and a second previous slicer decision (ŷ(n−2)) is −1. In response to a detection of a −1, 0, +1 symbol transition based on the determinations, the TED 200 may generate a value of 1 for mux_sel for the multiplexer 202 of FIG. 2 to cause the multiplexer 202 to select x(n−1). For example, the sequencer circuitry 142 may select the inputs to the TED 200. In some such examples, the sequencer circuitry 142 may select the first symbol 146 or the second symbol 148 to be provided to the TED 136 of FIG. 1 and/or the TED 200 of FIG. 2 based on a state (such as the sequencer state) of the sequencer circuitry 142. Advantageously, the sequencer circuitry 142 may select the first symbol 146 prior to a timing lock achieved by the PLL 146 and select the second symbol 148 after a timing lock is achieved by the PLL 146 to reduce the noise after the timing lock is achieved. Advantageously, the sequencer circuitry 142 may instruct the TED 136 and/or the TED 200 to use the second symbol 148 after the timing lock to reduce noise due to ISI. In some examples, the timing error may be determined based on the example of Equation (1) below:

$$ted(n) = x(n-1) * \text{sign}(\hat{y}(n)),\qquad\text{Equation (1)}$$

For example, the TED 200 may determine the current timing error to be the same as the previous slicer input in response to a determination of a positive slope or a negative slope. The TED 200 may determine the positive slope based on a −1, 0, +1 symbol transition (such as a negative one value, a zero value, and positive one value). The TED 200 may determine the negative slope based on a +1, 0, −1 symbol transition (such as a positive one value, a zero value, and negative one value). For example, x(n−1) may represent a timing error generated by the TED 200 in response to a detection of a positive slope based on the −1, 0, +1 symbol transition. Advantageously, the PLL 144 of FIG. 1 may adjust a phase of the ADC 108 based on the timing error x(n−1) to sample a subsequent symbol of the RX input 112 at the correct phase, which is depicted by reference numeral 310.

In the illustrated example, the sequencer circuitry 142 may determine that a current slicer decision (ŷ(n)) of the slicer circuitry 128 is −1, a first previous slicer decision (ŷ(n−1)) is 0, and a second previous slicer decision (ŷ(n−2)) is +1. In response to a detection of a +1, 0, −1 symbol transition based on the determinations, the TED 200 may generate a value of 2 for mux_sel for the multiplexer 202 of FIG. 2 to cause the multiplexer 202 to select −x(n−1). For example, the timing error may be determined based on the example of Equation (1) above. In some such examples, −x(n−1) may be a negative value of the timing error generated by the TED 200 in response to a detection of a negative slope based on the +1, 0, −1 symbol transition. Advantageously, the PLL 144 of FIG. 1 may adjust a phase of the ADC 108 based on −x(n−1) to sample a subsequent symbol of the RX input 112 at the correct phase, which is depicted by reference numeral 312.

In some examples, the TED 200 may generate a value of 0 for mux_sel for the multiplexer 202 of FIG. 2 when neither of the above-referenced symbol transitions are detected to cause the multiplexer 202 to output of value of 0 when carrying out the first pseudocode 302. In some examples, the TED 200 may generate a value of 0 for mux_sel for the multiplexer 202 of FIG. 2 when neither of the above-referenced symbol transitions are detected to cause the multiplexer 202 to output a previously generated timing error (identified by ted(n−1)) when carrying out the second pseudocode 304. Advantageously, in some such examples, holding to previous timing error values improves a gain of the TED 136 of FIG. 1 and/or the TED 200 of FIG. 1 and improves locking ability (such as by locking faster) of the PLL 144 of FIG. 1. Advantageously, the TED 200 of FIG. 2, the TED 136 of FIG. 1, and/or, more generally, the DSP 102 of FIG. 1, may utilize PAM symbol transition to determine a timing error by carrying out the first pseudocode 302 and/or the second pseudocode 304.

Figure 4:
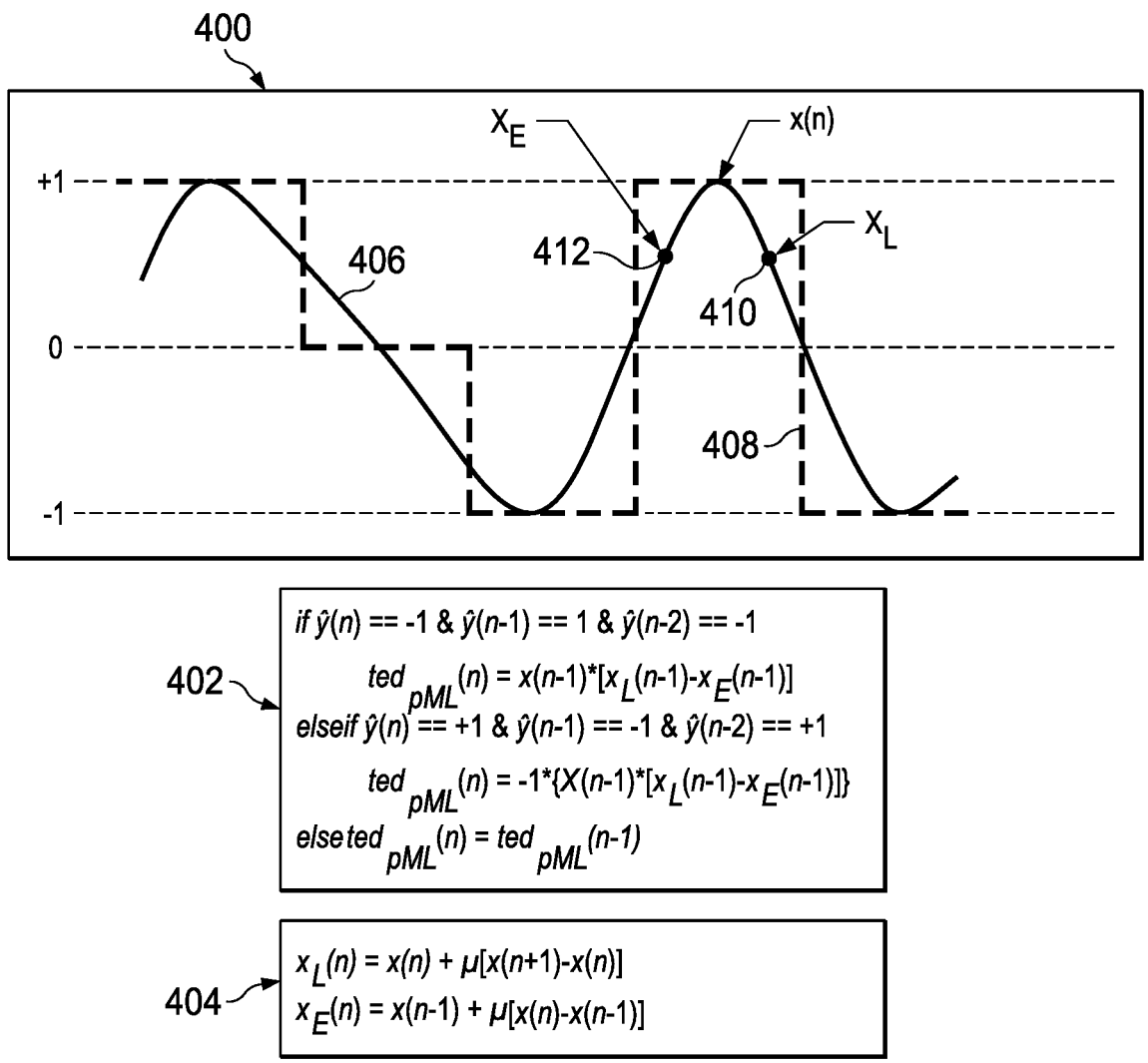
FIG. 4 is a second timing diagram and example pseudocode that may be carried out by the DSP of FIG. 1 and/or the TED of FIGS. 1 and/or 2 to execute a second example symbol and timing recovery technique.

FIG. 4 depicts a second timing diagram 400 corresponding to example operation of the TED 200 of FIG. 2, the TED 136 of FIG. 1, and/or, more generally, the DSP 102 of FIG. 1. Further depicted in FIG. 4 is first example pseudocode 402 and second example pseudocode 404 that may be performed by the TED 200 of FIG. 2, the TED 136 of FIG. 1, and/or, more generally, the DSP 102 of FIG. 1. In some examples, the first pseudocode 402 and/or the second pseudocode 404 may be implemented by the DSP 102 to carry out a second symbol and timing recovery technique. For example, the second symbol and timing recovery technique may be a pseudo maximum likelihood (ML) technique. In some such examples, the TED 200 of FIG. 2, the TED 136 of FIG. 1, and/or, more generally, the DSP 102 of FIG. 1, may carry out the pseudo ML technique to interpolate samples to determine an approximate differentiating sample based on the example of Equation (2) below:

$$ted_{ML}(n) = x(n) * \dot{x}(n),\qquad\text{Equation (2)}$$

In the example of Equation (2) above, $ted_{ML}(n)$ is the timing error that may be generated by the TED 136 of FIG. 1 and/or the TED 200 of FIG. 2. In the example of Equation (2) above, x(n) is a current uncorrected symbol (such as the first symbol 146 of FIG. 1) and ẋ(n) is the derivative of the current uncorrected symbol. For example, in response to a detection of a peak symbol point transition (such as a −1, +1, −1 symbol transition) or a valley symbol point transition (such as a +1, −1, +1 symbol transition), the timing error is 0 because the derivative at the peak or valley symbol point transitions is 0. Elsewhere, the derivative is non-zero, which causes the timing error to be non-zero and the TED 200 thereby may indicate a direction of the timing error.

The second timing diagram 400 depicts an example analog signal waveform 406 and an example pulse waveform 408. In some examples, the analog signal waveform 406 may be the RX input 112 of FIG. 1. In some examples, the pulse waveform 408 may be the output of the slicer circuitry 128 of FIG. 1. For example, the pulse waveform 408 may be symbols generated by the slicer circuitry 128 (such as the third symbol 150 of FIG. 1).

In example operation, the TED 136 of FIG. 1 and/or the TED 200 of FIG. 2 may implement the first pseudocode 402 to determine a timing error ($ted_{pML}(n)$). For example, the sequencer circuitry 142 may determine that a current slicer decision (ŷ(n)) of the slicer circuitry 128 of FIG. 1 is −1, a first previous slicer decision (ŷ(n−1)) is +1, and a second previous slicer decision (ŷ(n−2)) is −1. In response to a detection of a peak symbol point transition based on the −1, +1, −1 symbol transition, the TED 136 and/or the TED 200 may generate the timing error based on the example of Equation (3) below:

$$ted_{pML}(n)=x(n-1)*[x_L(n-1)-x_E(n-1)],\qquad\text{Equation (3)}$$

In the example of Equation (3) above, the difference between $x_L(n-1)$ and $x_E(n-1)$ is an approximation of a derivative of $x(n-1)$ and thereby is a differentiator output. Alternatively, one or more filters may be used to determine the differentiator output. In some examples, $x_L$ may represent a first timing error approximation of the analog signal waveform 406 at a first example point 410 and $x_E$ may represent a second timing error approximation of the analog signal waveform 406 at a second example point 412. The differentiator outputs $x_L$ and $x_E$ may be determined based on the examples of Equation (4) and Equation (5) below, which are included in the second pseudocode 404:

$$x_L(n)=x(n)+\mu[x(n+1)-x(n)],\qquad\text{Equation (4)}$$

$$x_E(n)=x(n-1)+\mu[x(n)-x(n-1)],\qquad\text{Equation (5)}$$

In the example of Equation (4) above, the value of $\mu$ may be controlled to determine an interpolation rate for the symbols. In example operation, the sequencer circuitry 142 of FIG. 1 may determine that a current slicer decision (ŷ(n)) of the slicer circuitry 128 of FIG. 1 is +1, a first previous slicer decision (ŷ(n−1)) is −1, and a second previous slicer decision (ŷ(n−2)) is +1. In response to a detection of a valley symbol point transition based on the −1, +1, −1 symbol transition, the TED 136 and/or the TED 200 may generate the timing error based on the example of Equation (6) below:

$$ted_{pML}(n)=-1*\{x(n-1)*[x_L(n-1)-x_E(n-1)]\},\qquad\text{Equation(6)}$$

In some examples, the TED 136 and/or the TED 200 may determine that neither a peak symbol point transition nor a valley symbol point transition is detected. In some such examples, the TED 136 and/or the TED 200 may output a previously generated timing error (identified by $ted_{pML}(n-1)$) when carrying out the second pseudocode 402. Advantageously, in some such examples, holding to previous timing error values improves a gain of the TED 136 and/or the TED 200 and improves locking ability (such as by locking faster) of the PLL 144 of FIG. 1. Advantageously, the TED 200 of FIG. 2, the TED 136 of FIG. 1, and/or, more generally, the DSP 102 of FIG. 1, may utilize PAM symbol transition to determine a timing error by carrying out the first pseudocode 302 and/or the second pseudocode 304.

Figure 5:
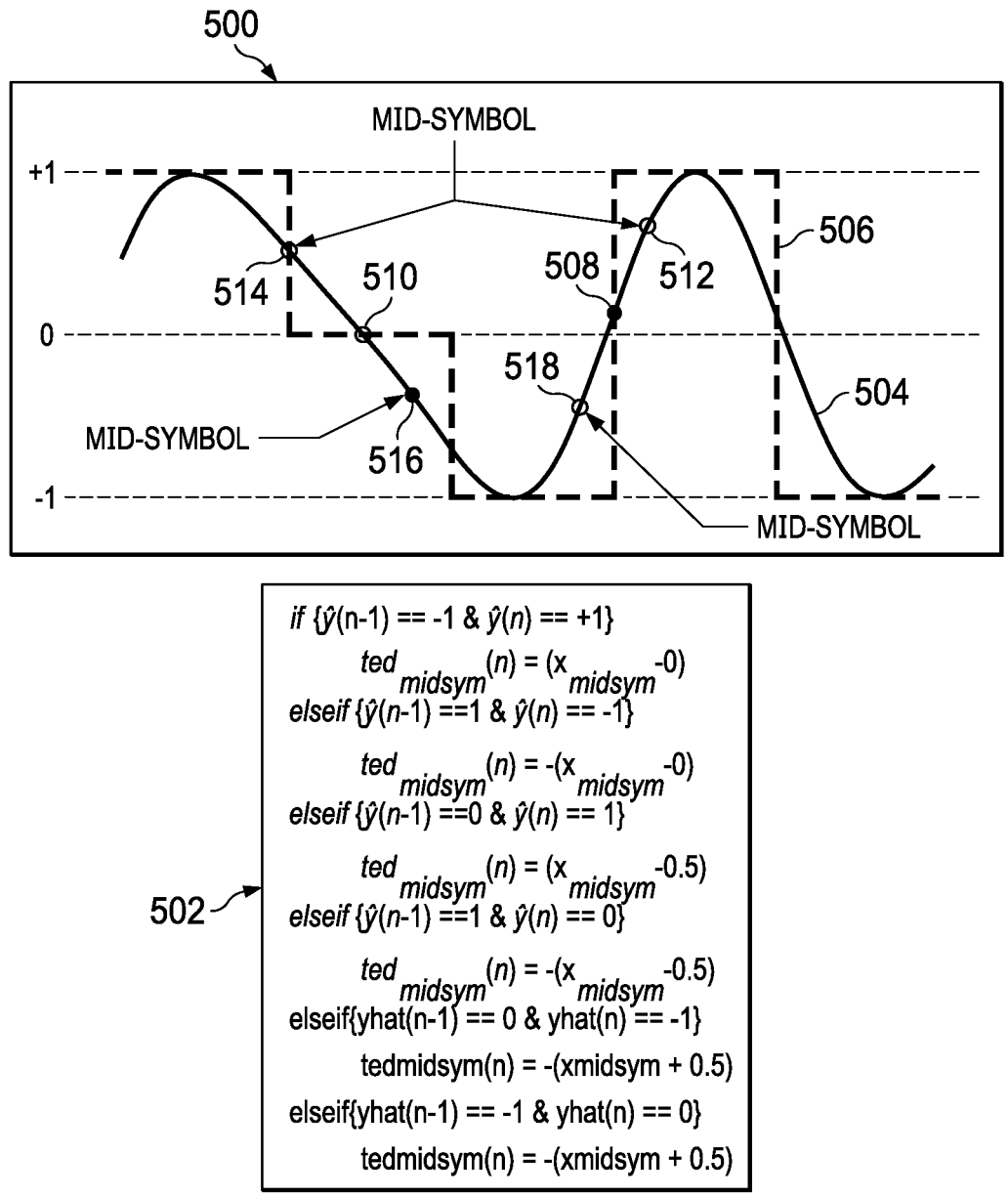
FIG. 5 is a third timing diagram and example pseudocode that may be carried out by the DSP of FIG. 1 and/or the TED of FIGS. 1 and/or 2 to execute a third example symbol and timing recovery technique.

FIG. 5 depicts a third timing diagram 500 corresponding to example operation of the TED 200 of FIG. 2, the TED 136 of FIG. 1, and/or, more generally, the DSP 102 of FIG. 1. Further depicted in FIG. 5 is example pseudocode 502 that may be performed by the TED 200 of FIG. 2, the TED 136 of FIG. 1, and/or, more generally, the DSP 102 of FIG. 1. In some examples, the pseudocode 502 may be utilized by the DSP 102 to carry out a third symbol and timing recovery technique. For example, the third symbol and timing recovery technique may be a mid-symbol TED technique. In some such examples, the TED 136 and/or the TED 200 may utilize the pseudocode 502 to interpolate the samples to a middle or midpoint of a symbol and compare the interpolation with the expected midpoint. Under these conditions, the comparisons may be based on the PAM symbol transitions. Alternatively, one or more filters may be used to determine the midpoints.

The third timing diagram 500 depicts an example analog signal waveform 504 and an example pulse waveform 506. In some examples, the analog signal waveform 504 may be the RX input 112 of FIG. 1. In some examples, the pulse waveform 506 may be the output of the slicer circuitry 128 of FIG. 1. For example, the pulse waveform 506 may be symbols generated by the slicer circuitry 128 (such as the third symbol 150 of FIG. 1).

In example operation, the TED 136 of FIG. 1 and/or the TED 200 of FIG. 2 may carry out the pseudocode 502 to determine a timing error ($ted_{midsym}(n)$). For example, the sequencer circuitry 142 may determine that a current slicer decision (ŷ(n)) of the slicer circuitry 128 of FIG. 1 is +1 and a previous slicer decision (ŷ(n−1)) is −1. For example, the sequencer circuitry 142 may determine that a prediction or estimate of +1 for the third symbol 150 of FIG. 1 based on a −1, +1 symbol transition may indicate that the second symbol 148 of FIG. 1 is at a 0 symbol. Under these conditions, the TED 136 and/or the TED 200 may determine that the second symbol 148 is at a first example symbol position 508. In response to identifying the first symbol position 508, the TED 136 and/or the TED 200 may generate a timing error based on a difference between $x_{midsym}$ and 0 and thereby determine the timing error to be $x_{midsym}$. In some examples, the timing error signal may be a waveform having an amplitude (such as a voltage) representative of the timing error. Advantageously, the PLL 144 of FIG. 1 may adjust a phase of the ADC 108 based on the timing error signal to sample a subsequent symbol of the RX input 112 at the correct phase, which is represented by the first symbol position 508.

In some examples, the sequencer circuitry 142 may determine that a current slicer decision (ŷ(n)) of the slicer circuitry 128 of FIG. 1 is −1 and a previous slicer decision (ŷ(n−1)) is +1. For example, the sequencer circuitry 142 may determine that a prediction or estimate of −1 for the third symbol 150 of FIG. 1 based on a +1, −1 symbol transition may indicate that the second symbol 148 of FIG. 1 is at a 0 symbol. Under these conditions, the TED 136 and/or the TED 200 may determine that the second symbol 148 is at a second example symbol position 510. In response to identifying the second symbol position 510, the TED 136 and/or the TED 200 may generate a timing error based on a negative difference between $x_{midsym}$ and 0 and thereby determine the timing error to be $-x_{midsym}$. In some examples, the timing error signal may be a waveform having an amplitude (such as a voltage) representative of the timing error. Advantageously, the PLL 144 of FIG. 1 may adjust a phase of the ADC 108 based on the timing error signal to sample a subsequent symbol of the RX input 112 at the correct phase, which is represented by the second symbol position 510.

In example operation, the sequencer circuitry 142 may determine that a current slicer decision (ŷ(n)) of the slicer circuitry 128 of FIG. 1 is +1 and a previous slicer decision (ŷ(n−1)) is 0. In response to a detection of a 0, +1 symbol transition based on the determinations, the TED 136 and/or the TED 200 generates a timing error based on a difference between $x_{midsym}$ and a coefficient of 0.5. Alternatively, the coefficient may be any other value. Under these conditions, the TED 136 and/or the TED 200 may determine that a prediction or estimate of +1 for the third symbol 150 of FIG. 1 based on a 0, +1 symbol transition may indicate that the second symbol 148 of FIG. 1 is between symbols (such as being a mid-symbol or an intermediate symbol, between a first symbol of 0 and a second symbol of +1, etc.). Under these conditions, the TED 136 and/or the TED 200 may determine that the second symbol 148 is at a third example symbol position 512. In this example, the third symbol position 512 is a mid-symbol position. In response to identifying the third symbol position 512, the TED 136 and/or the TED 200 may determine the timing error to be $(x_{midsym}-0.5)$. In some examples, the timing error signal may be a waveform having an amplitude (such as a voltage) representative of the timing error. Advantageously, the PLL 144 of FIG. 1 may adjust a phase of the ADC 108 based on the timing error signal to sample a subsequent symbol of the RX input 112 at the correct phase, which is the 0 symbol.

In example operation, the sequencer circuitry 142 may determine that a current slicer decision ($\hat{y}(n)$) of the slicer circuitry 128 of FIG. 1 is 0 and a previous slicer decision ($\hat{y}(n-1)$) is +1. In response to a detection of a +1, 0 symbol transition based on the determinations, the TED 136 and/or the TED 200 generates a timing error based on a negative difference between $x_{midsym}$ and a coefficient 0.5. Alternatively, the coefficient may be any other value. Under these conditions, the TED 136 and/or the TED 200 may determine that a prediction or estimate of 0 for the third symbol 150 of FIG. 1 based on a +1, 0 symbol transition may indicate that the second symbol 148 of FIG. 1 is between symbols (such as being a mid-symbol or an intermediate symbol, between a first symbol of +1 and a second symbol of 0, etc.). Under these conditions, the TED 136 and/or the TED 200 may determine that the second symbol 148 is at a fourth example symbol position 514. In this example, the fourth symbol position 514 is a mid-symbol position. In response to identifying the fourth symbol position 512, the TED 136 and/or the TED 200 may determine the timing error to be $-(x_{midsym}-0.5)$. In some examples, the timing error signal may be a waveform having an amplitude (such as a voltage) representative of the timing error. Advantageously, the PLL 144 of FIG. 1 may adjust a phase of the ADC 108 based on the timing error signal to sample a subsequent symbol of the RX input 112 at the correct phase, which is the +1 symbol prior to the fourth symbol position 514.

In example operation, the sequencer circuitry 142 may determine that a current slicer decision ($\hat{y}(n)$) of the slicer circuitry 128 of FIG. 1 is −1 and a previous slicer decision ($\hat{y}(n-1)$) is 0. In response to a detection of a 0, −1 symbol transition based on the determinations, the TED 136 and/or the TED 200 generates a timing error based on a negative sum between $x_{midsym}$ and a coefficient of 0.5. Alternatively, the coefficient may be any other value. Under these conditions, the TED 136 and/or the TED 200 may determine that a prediction or estimate of −1 for the third symbol 150 of FIG. 1 based on a 0, −1 symbol transition may indicate that the second symbol 148 of FIG. 1 is between symbols (such as being a mid-symbol or an intermediate symbol, between a first symbol of 0 and a second symbol of −1, etc.). Under these conditions, the TED 136 and/or the TED 200 may determine that the second symbol 148 is at a fifth example symbol position 516. In this example, the fifth symbol position 516 is a mid-symbol position. In response to identifying the fifth symbol position 516, the TED 136 and/or the TED 200 may generate a timing error based on a negative sum of $x_{midsym}$ and 0.5 and thereby determine the timing error to be $-(x_{midsym}+0.5)$. In some examples, the timing error signal may be a waveform having an amplitude (such as a voltage) representative of the timing error. Advantageously, the PLL 144 of FIG. 1 may adjust a phase of the ADC 108 based on the timing error signal to sample a subsequent symbol of the RX input 112 at the correct phase, which may be the 0 symbol prior to the fifth symbol position 516.

In example operation, the sequencer circuitry 142 may determine that a current slicer decision ($\hat{y}(n)$) of the slicer circuitry 128 of FIG. 1 is 0 and a previous slicer decision ($\hat{y}(n-1)$) is −1. In response to a detection of a −1, 0 symbol transition based on the determinations, the TED 136 and/or the TED 200 generates a timing error based on a negative sum of $x_{midsym}$ and a coefficient of 0.5. Alternatively, the coefficient may be any other value. Under these conditions, the TED 136 and/or the TED 200 may determine that a prediction or estimate of 0 for the third symbol 150 of FIG. 1 based on a −1, 0 symbol transition may indicate that the second symbol 148 of FIG. 1 is between symbols (such as being a mid-symbol or an intermediate symbol, between a first symbol of −1 and a second symbol of 0, etc.). Under these conditions, the TED 136 and/or the TED 200 may determine that the second symbol 148 is at a sixth example symbol position 518. In this example, the sixth symbol position 518 is a mid-symbol position. In response to identifying the sixth symbol position 518, the TED 136 and/or the TED 200 may generate a timing error based on a negative sum of $x_{midsym}$ and 0.5 and thereby determine the timing error to be $-(x_{midsym+}0.5)$. In some examples, the timing error signal may be a waveform having an amplitude (such as a voltage) representative of the timing error. Advantageously, the PLL 144 of FIG. 1 may adjust a phase of the ADC 108 based on the timing error signal to sample a subsequent symbol of the RX input 112 at the correct phase, which may be the −1 symbol prior to the sixth symbol position 518.

Figure 6:
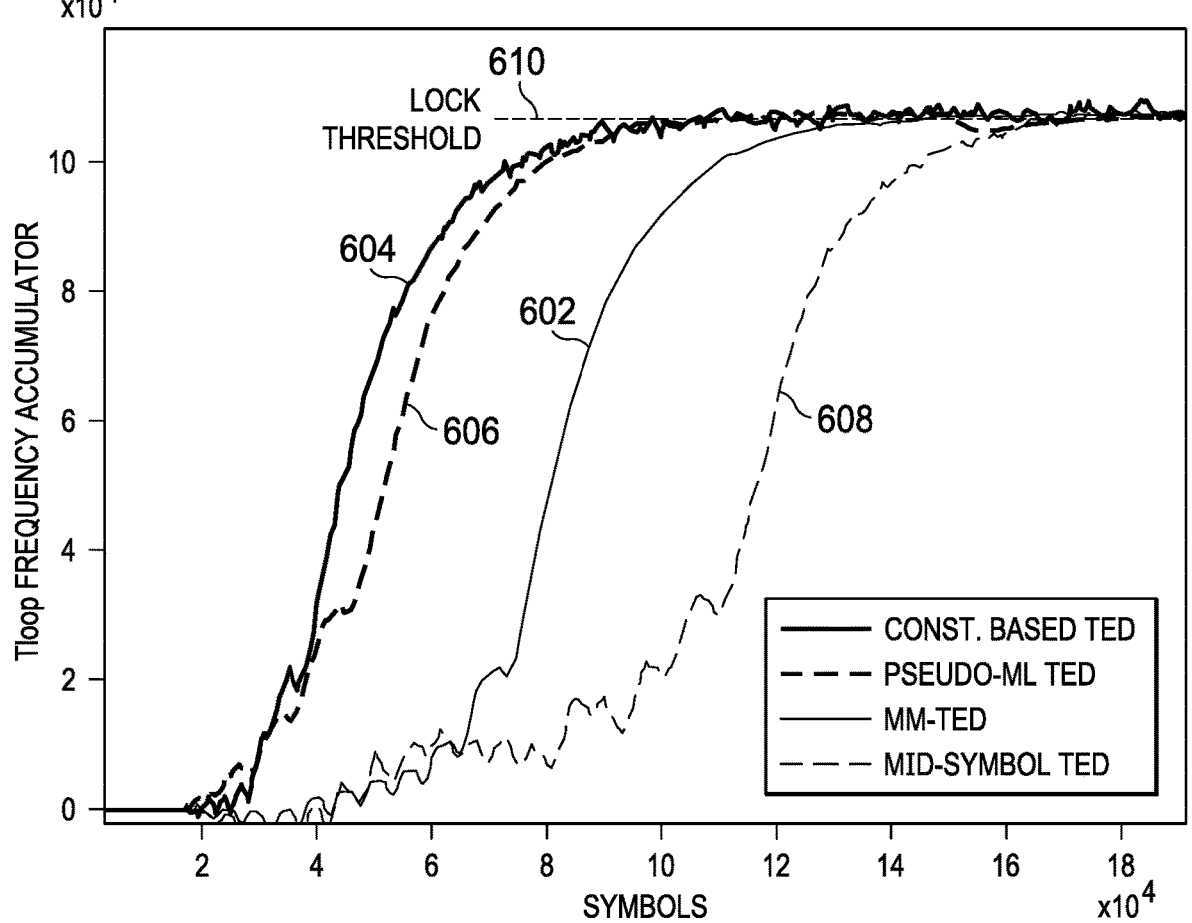
FIG. 6 is a first graph including first example waveforms to depict example frequency lock operation of different symbol and timing recovery techniques.

FIG. 6 is a graph 600 including example waveforms 602, 604, 606, 608 to depict example frequency lock operation associated with different symbol and timing recovery techniques. The x-axis (for plot 600) represents the number of symbols and the y-axis is the values of a timing loop (Tloop) frequency arm accumulator. The waveforms 602, 604, 606, 608 include a first example waveform 602 generated based on a Mueller-Muller (MM) TED technique, a second example waveform 604 generated based on a constellation-based TED technique, a third example waveform 606 generated based on a pseudo-ML TED technique, and a fourth example waveform 608 generated based on a mid-symbol TED technique. For example, the second waveform 604 may be generated in response to the TED 136 of FIG. 1 and/or the TED 200 of FIG. 2 carrying out the first pseudocode 302 and/or the second pseudocode 304 of FIG. 3. In some examples, the third waveform 606 may be generated in response to the TED 136 of FIG. 1 and/or the TED 200 of FIG. 2 carrying out the first pseudocode 402 and/or the second pseudocode 404 of FIG. 4. In some examples, the fourth waveform 608 may be generated in response to the TED 136 of FIG. 1 and/or the TED 200 of FIG. 2 carrying out the pseudocode 502 of FIG. 5.

The graph 600 depicts frequency lock operation (such as achieving a timing lock, timing loop lock, etc., of the PLL 144 of FIG. 1) of the different waveforms 602, 604, 606, 608 with respect to a number of detected symbols. For example, the different waveforms 602, 604, 606, 608 may achieve a lock in response to a value of a timing loop frequency accumulator (such as the NCO 140 of FIG. 1) satisfying an example threshold (such as a value of a lock threshold) 610. In some examples, the threshold 610 may be user defined (such as by being pre-programmed, configured, etc., prior to the DSP 102 of FIG. 1 processing the communication channel). In some examples, the threshold 610 may be dynamically adjusted by the sequencer circuitry 142. For example, the sequencer circuitry 142 may adjust the threshold 610 based on a historical SNR of the DSP (such as an SNR of the DSP 102 over one or more previous clock cycles).

In some examples, the graph 600 may depict the frequency lock operation for relatively short communication channels (such as cable lengths of 0.5 meters, 1.0 meters, etc.), which present challenging cases because short communication channels have low ISI. Advantageously, in the illustrated example, the constellation-based TED technique and the pseudo-ML TED technique have improved frequency lock operation compared to the MM-TED technique in low ISI examples. Advantageously, in some examples, the constellation-based TED technique and the pseudo-ML TED technique have improved frequency lock operation compared to the MM-TED technique independent of and/or otherwise irrespective of the channel length or ISI present in the channel.

Figure 7:
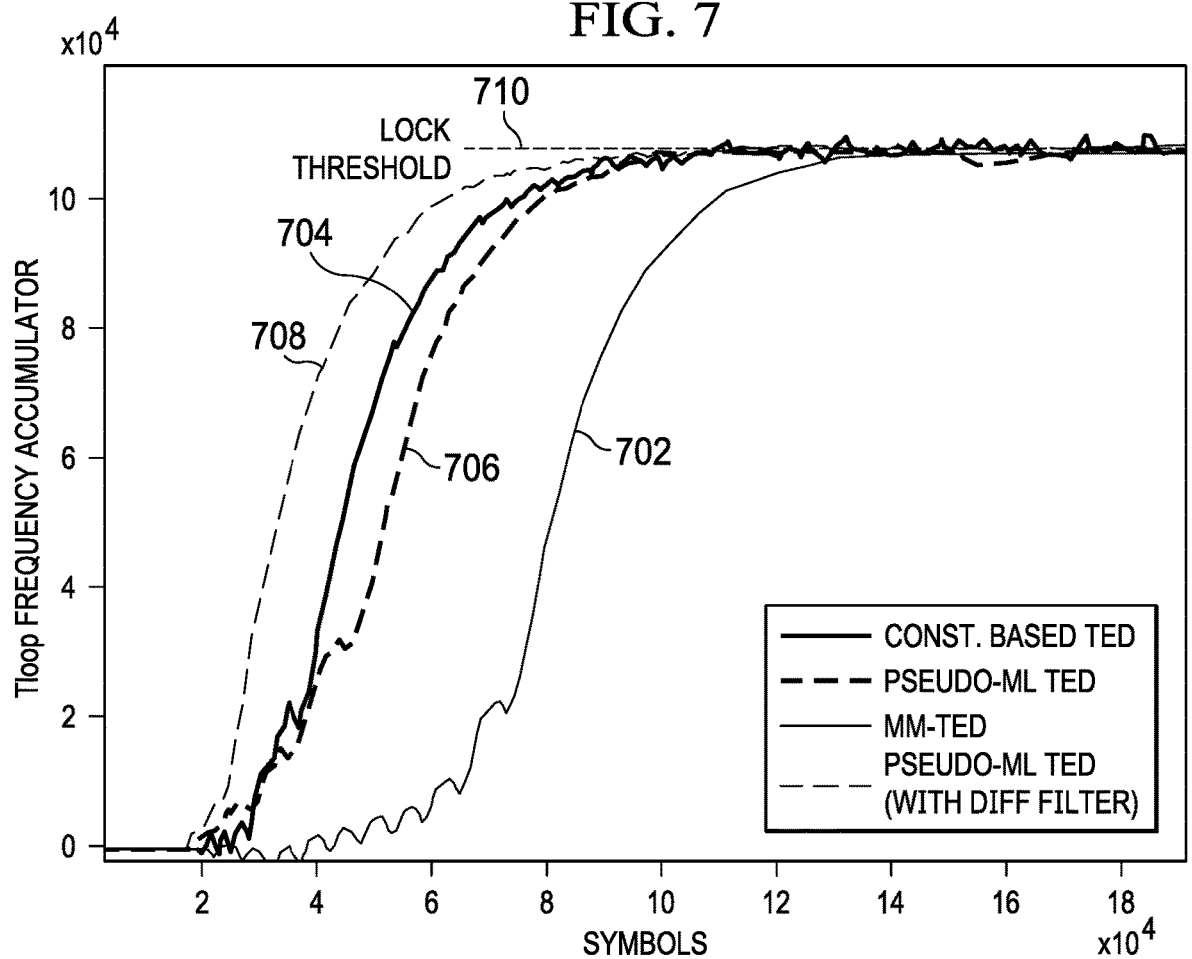
FIG. 7 is a second graph including second example waveforms to depict example frequency lock operation of different symbol and timing recovery techniques.

FIG. 7 is a graph 700 including example waveforms 702, 704, 706, 708 to depict example frequency lock operation associated with different symbol and timing recovery techniques. The x-axis (for plot 700) represents the number of symbols and the y-axis is the values of a timing loop (Tloop) frequency arm accumulator. The waveforms 702, 704, 706, 708 include a first example waveform 702 generated based on a Mueller-Muller (MM) TED technique, a second example waveform 704 generated based on a constellation-based TED technique, a third example waveform 706 generated based on a pseudo-ML TED technique, and a fourth example waveform 708 generated based on a pseudo-ML TED technique with a differentiator filter. For example, the second waveform 704 may be generated in response to the TED 136 of FIG. 1 and/or the TED 200 of FIG. 2 carrying out the first pseudocode 302 and/or the second pseudocode 304 of FIG. 3. In some examples, the third waveform 706 may be generated in response to the TED 136 of FIG. 1 and/or the TED 200 of FIG. 2 carrying out the first pseudocode 402 and/or the second pseudocode 404 of FIG. 4. In some examples, the fourth waveform 708 may be generated in response to the TED 136 of FIG. 1 and/or the TED 200 of FIG. 2 carrying out the first pseudocode 402 and/or one or more filters to generate a differentiator output as described above in connection with FIG. 4. In some such examples, the one or more filters may implement the second pseudocode 404 of FIG. 4 to generate the differentiator output.

The graph 700 depicts frequency lock operation (such as achieving a timing lock, timing loop lock, etc., of the PLL 144 of FIG. 1) of the different waveforms 702, 704, 706, 708 with respect to a number of detected symbols. For example, the different waveforms 702, 704, 706, 708 may achieve a lock in response to a value of a timing loop frequency accumulator (such as the NCO 140 of FIG. 1) satisfying an example threshold (such as a value of a lock threshold) 710. In some examples, the graph 700 may depict the frequency lock operation for relatively short communication channels (such as cable lengths of 0.5 meters, 1.0 meters, etc.), which present challenging cases because of low ISI. Advantageously, in the illustrated example, the constellation-based TED technique, the pseudo-ML TED technique, and the pseudo-ML TED technique with the differentiator filter have improved frequency lock operation compared to the MM-TED technique in low ISI examples. Advantageously, in some examples, the constellation-based TED technique, the pseudo-ML TED technique, and the pseudo-ML TED technique with the differentiator filter have improved frequency lock operation compared to the MM-TED technique independent of and/or otherwise irrespective of the channel length or ISI present in the channel.

Figure 8:
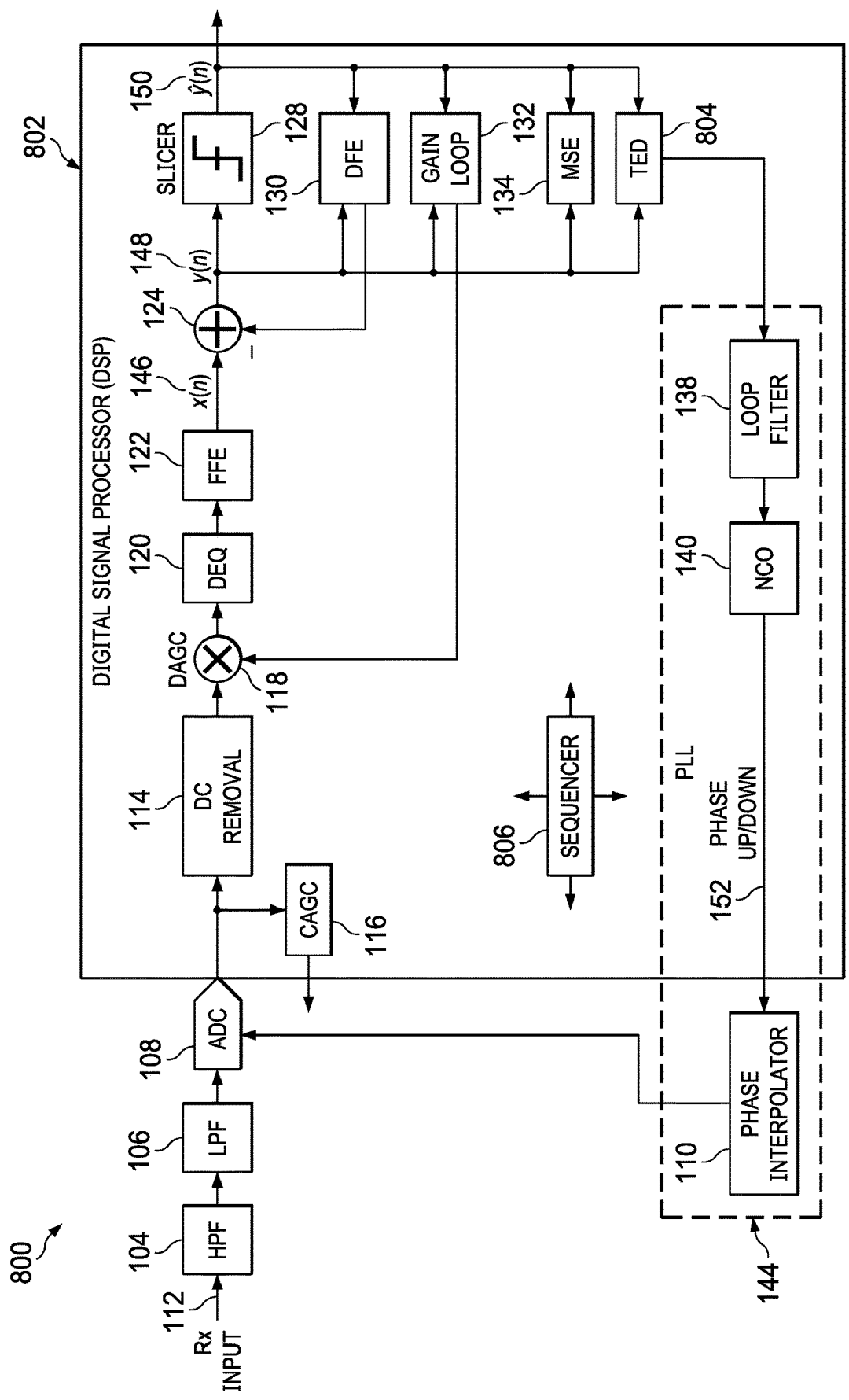
FIG. 8 is a block diagram of another example implementation of the communication system of FIG. 1.

FIG. 8 is a block diagram of an example communication system (such as a digital communication system) 800 including an example digital signal processor (DSP) 802. In some examples, the DSP 802, and/or, more generally, the communication system 800, may be an Ethernet PHY device. The communication system 800 includes the RX input 112, the HPF 104, the LPF 106, the ADC 108, and the phase interpolator circuitry 110 of FIG. 1.

The DSP 802 includes the DC removal circuitry 114, the CAGC 116, the DAGC 118, the DEQ 120, the FFE 122, the adder circuitry 124, the slicer circuitry 128, the DFE 130, the gain loop circuitry 132, the MSE circuitry 134, the loop filter 138, the NCO 140, and the PLL 144 of FIG. 1. Further depicted in FIG. 8, are the first symbol 146, the second symbol 148, and the third symbol 150, and the control signal 152 of FIG. 1. The DSP 802 includes additional examples of a TED 804 and sequencer circuitry 806.

In some examples, the DSP 802, the TED 804, the sequencer circuitry 806, and/or, more generally, the communication system 800, carries out an M&M timing synchronization technique to adjust a phase of the ADC 108. For example, operation of the DSP 802 may depend on ISI of the channel of the communication system 800 to achieve a timing lock. In some such examples, the DSP 802 may utilize the M&M timing synchronization technique to balance the post-cursor ISI (P+1) with the pre-cursor ISI (P−1) to achieve lock. In some examples, the DSP 802 may utilize the M&M timing synchronization technique to utilize DFE corrected symbols (such as the second symbol 148) to achieve the timing lock. By using the M&M timing synchronization technique, the timing loop of the PLL 144 and the outputs from the DFE 130 must converge together, which can result in longer locking times or, in some examples, may result in instability of the timing loop. In some such examples, the timing loop controlled by the PLL 144 may not converge in systems with low ISI.

Advantageously, the DSP 102, and/or, more generally, the communication system 100 of FIG. 1, may achieve a timing lock quicker than the DSP 802 of FIG. 8 in low ISI systems and thereby may achieve reduced instances of timing loop instability. Advantageously, the DSP 102, and/or, more generally, the communication system 100 of FIG. 1, may carry out at least one of the first symbol and timing recovery technique (such as a constellation-based TED technique) depicted in FIG. 3, the second symbol and timing recovery technique (such as a pseudo-ML TED technique) depicted in FIG. 4, or the third symbol and timing recovery technique (such as a mid-symbol TED technique) depicted in FIG. 5.

Figure 9:
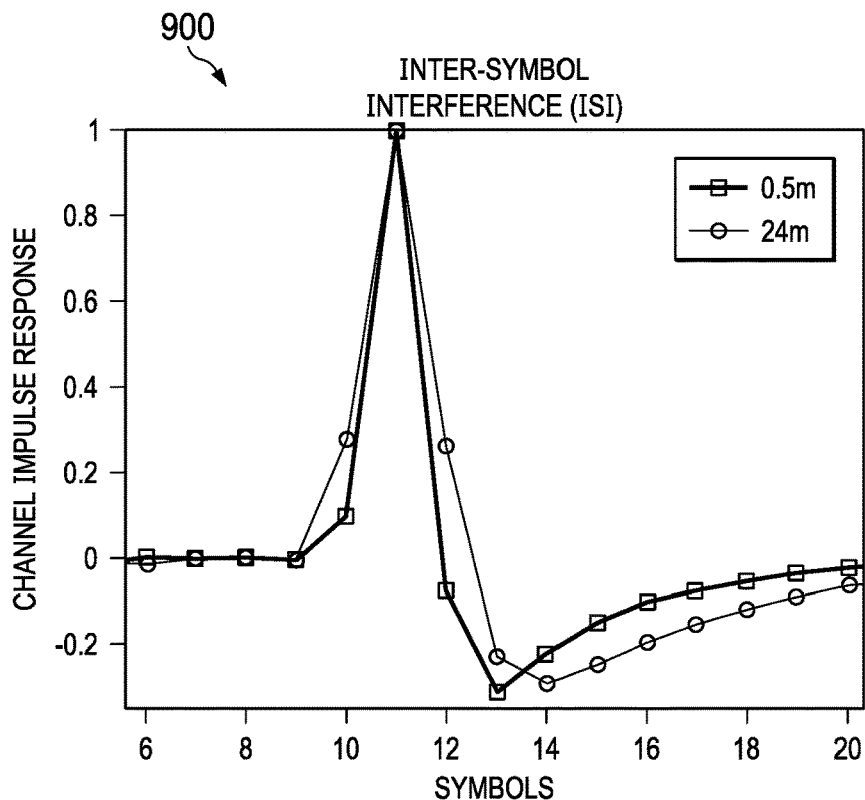
FIG. 9 is a plot of inter-symbol interference of example operation of the DSP of FIG. 8.

FIG. 9 is a plot 900 of inter-symbol interference (ISI) associated with example operation of the DSP 802 of FIG. 8. The plot 900 has an x-axis of symbols and a y-axis of channel impulse response. The plot 900 depicts example ISI behavior present when sampling symbol 11 with different channel lengths (such as a 0.5 meter channel length and a 24 meter channel length). For example, the channel impulse responses depicted in the plot 900 for symbols other than symbol 11 are representative of the ISI of the communication channel that is implemented by the communication system 100 of FIG. 1.

As depicted in the plot 900, the longer channel length has an improved channel impulse response compared to the shorter channel length. As such, the DSP 802 may have reduced performance at low ISI levels. For example, there may be increased ISI in a communication channel having a shorter channel length and there may be increased ISI in a communication channel having a longer channel length. In the plot 900, there is less ISI with the 0.5 channel length and a TED using the conventional M&M timing synchronization technique (such as the TED 804 of FIG. 8) may have difficulty detecting symbols with low ISI (such as having difficulty detecting symbol 11 in the plot 900) because the conventional M&M timing synchronization technique relies on higher levels of ISI for detectability. Advantageously, the DSP 102 of FIG. 1, and/or, more generally, the communication system 100 of FIG. 1, has improved performance at low ISI levels independent of channel length compared to the DSP 802 of FIG. 8. For example, the TED 136 of FIG. 1 and/or the TED 200 of FIG. 2 may implement one or more of the symbol and timing recovery techniques as described herein, which demonstrate improved detectability of symbols at shorter channel lengths and thereby overcomes the deficiencies of the conventional M&M timing synchronization technique at low ISI levels.

Figure 10:
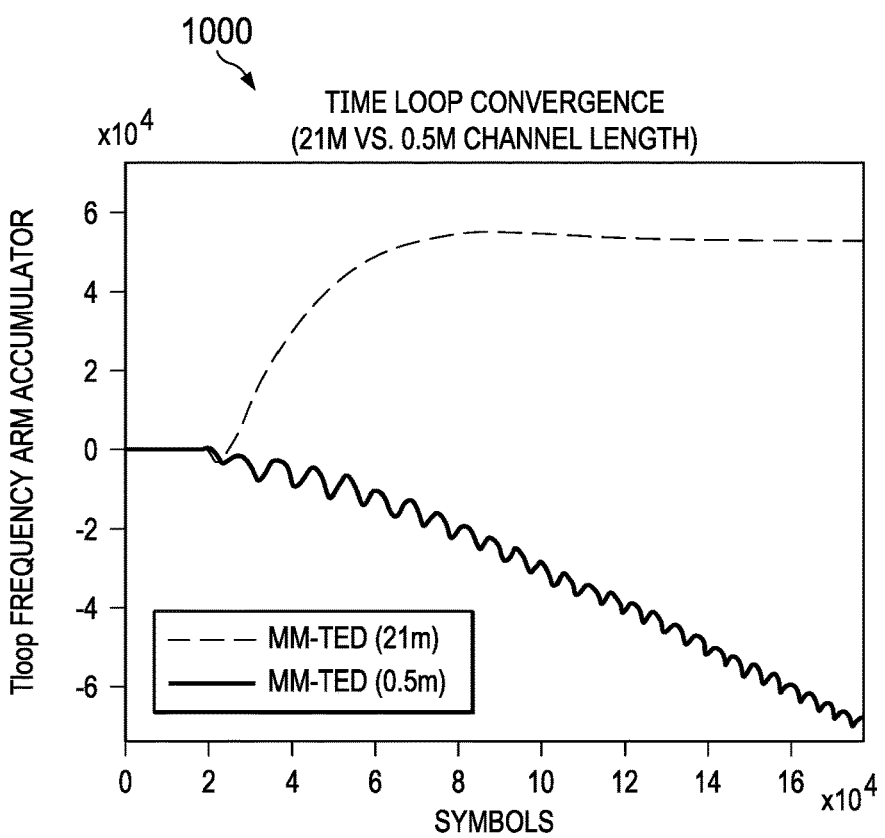
FIG. 10 is a plot of time loop convergence of example operation of the DSP of FIG. 8.

FIG. 10 is a plot 1000 of time loop convergence associated with example operation of the DSP 802 of FIG. 8. The x-axis (for plot 1000) represents the number of symbols and the y-axis is the values of a timing loop (Tloop) frequency arm accumulator. The plot 1000 depicts a first time loop convergence of a 0.5 meter channel length (such as a cable having a length of 0.5 meters) and a second time loop convergence of a 21 meter channel length (such as a cable having a length of 21 meters). As depicted in the plot 1000, the DSP 802 does not achieve time loop convergence at the lower channel length. Advantageously, the DSP 102 of FIG. 1 achieves time loop convergence at lower channel lengths, which is depicted in the illustrated examples of FIGS. 7 and/or 8, and the DSP 102 thereby achieves improved performance compared to the DSP 802 of FIG. 8.

Figure 11:
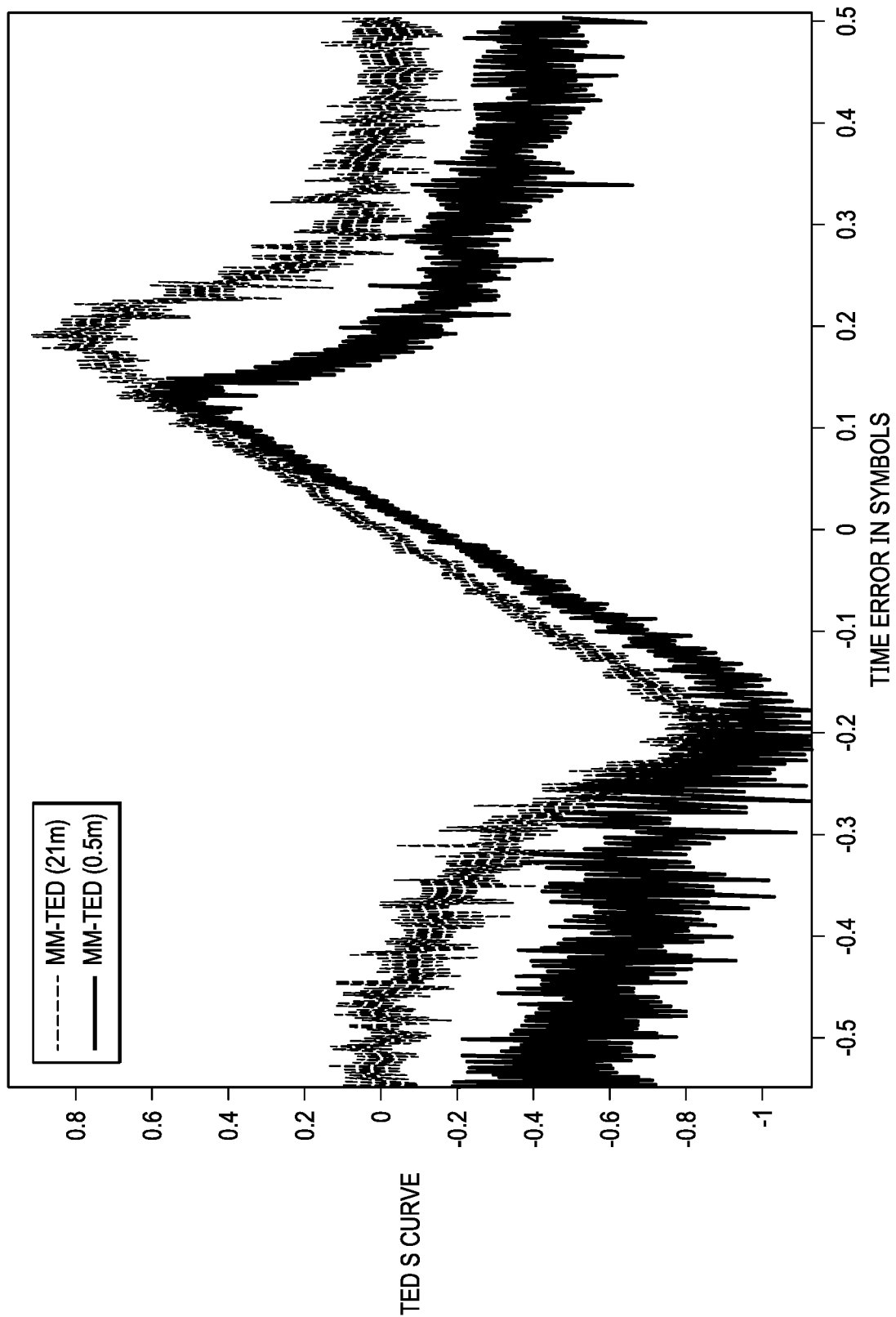
FIG. 11 is a plot of timing error with respect to gain of example operation of the DSP of FIG. 8.

FIG. 11 is a plot 1100 of timing error with respect to gain associated with example operation of the DSP 802 of FIG. 8. The plot 1100 has an x-axis of time error in symbols and a y-axis of a TED S-curve. The plot 1100 depicts a first gain with respect to time error in symbols of a first channel length of 0.5 meters and a second gain with respect to time error in symbols of a second channel length of 21 meters. As depicted in the plot 1100, the longer channel length has an improved gain response compared to the shorter channel length. As such, the DSP 802 may have reduced performance at shorter channel lengths because the DSP 800 relies on higher levels of ISI for symbol detectability. Advantageously, the DSP 102 of FIG. 1, and/or, more generally, the communication system 100 of FIG. 1, has improved performance at shorter channel lengths compared to the DSP 802 of FIG. 8 because its performance in symbol detectability is independent of ISI levels whereas the conventional M&M timing synchronization technique is not independent of ISI levels and, instead, relies on ISI levels for symbol detectability.

Flowcharts representative of example processes that may be performed using example hardware logic, example machine readable instructions (such as hardware readable instructions), example hardware implemented state machines, and/or any combination thereof configured to implement the TED 136, the sequencer circuitry 142, the DSP 102, the communication system device 100 of FIG. 1, and/or the TED 200 of FIG. 2 are shown in FIGS. 12-15. The example machine readable instructions may be one or more executable programs or portion(s) of an executable program for execution by programmable processor(s) (such as programmable microprocessor(s)), programmable controller(s), GPU(s), DSP(s), ASIC(s), PLD(s), and/or FPLD(s). The program may be embodied in software stored on a non-transitory computer readable storage medium (such as electrically erasable programmable read-only memory (EEPROM), non-volatile memory, volatile memory, etc.), but the entire program and/or parts thereof could alternatively be executed by any other device (such as a programmable device) and/or embodied in firmware or dedicated hardware. Further, although the example program(s) is/are described with reference to the flowcharts illustrated in FIGS. 12-15, many other methods of and/or techniques implementing the TED 136, the sequencer circuitry 142, the DSP 102, the communication system device 100 of FIG. 1, and/or the TED 200 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (such as discrete and/or integrated analog and/or digital circuitry, a field programmable logic device (such as a field programmable gate array (FPGA)), an application specific integrated circuit (ASIC), a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (such as portions of instructions, code, representations of code, etc.) useful to create, manufacture, and/or produce machine executable instructions. For example, the machine readable instructions may be fragmented and stored on one or more storage devices. The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

The machine readable instructions described herein can be represented by any past, present, or future instruction language, scripting language, programming language, etc. For example, the machine readable instructions may be represented using any of the following languages: assembly language, C, C++, Java, C#, Perl, Python, JavaScript, HyperText Markup Language (HTML), Structured Query Language (SQL), Swift, etc.

As described above, the example processes of FIGS. 12-15 may be implemented using executable instructions (such as computer, machine, and/or hardware readable instructions) stored on a non-transitory computer and/or machine readable medium, such as a flash memory, a read-only memory, a cache, a random-access memory, and/or any other storage device or storage disk in which information is stored for any duration (such as for extended time periods, permanently, for brief instances, for temporarily buffering, and/or for caching of the information). As used herein, the terms non-transitory computer readable medium, non-transitory machine readable medium, and/or non-transitory hardware readable medium is/are expressly defined to include any type of computer, machine, and/or hardware readable storage device and/or storage disk and to exclude propagating signals and to exclude transmission media.

Figure 12:
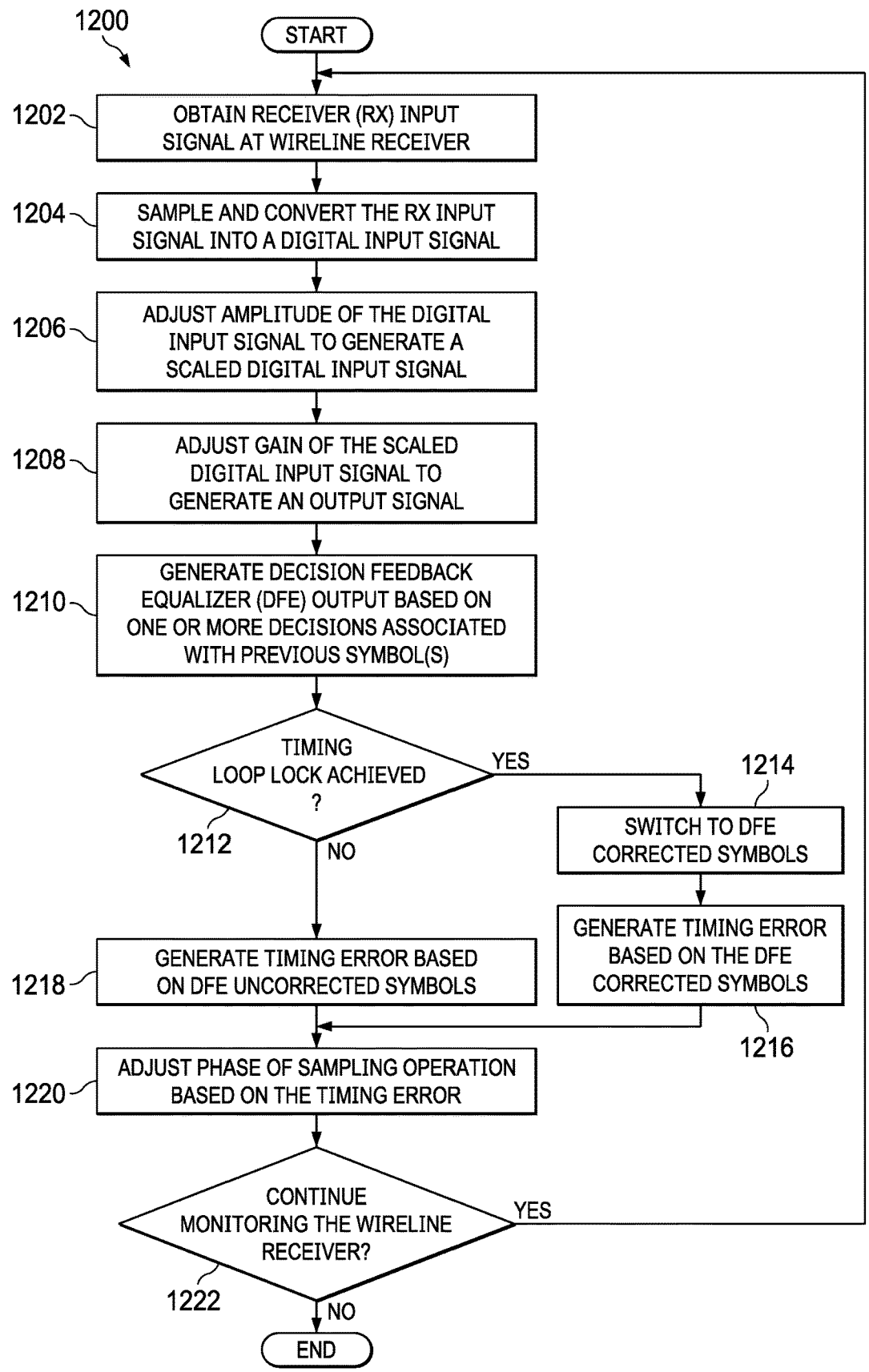
FIG. 12 is a flowchart representative of an example process that may be performed using machine readable instructions and/or hardware configured to implement the example DSP of FIG. 1, and/or, more generally, an example Ethernet PHY device, to carry out symbol and timing recovery techniques as described herein.

FIG. 12 is a flowchart representative of an example process 1200 that may be performed to carry out symbol and timing recovery techniques as described herein. The example process 1200 of FIG. 12 begins at block 1202, at which the communication system 100 obtains a receiver (RX) input signal at a wireline receiver. For example, the HPF 104 may receive the RX input 112 from a terminal of a wireline receiver (such as a receiver of an Ethernet PHY device).

At block 1204, the communication system 100 samples and converts the RX input signal into a digital input signal. For example, the ADC 108 may sample the RX input 112 at a sample rate of one sample per second, which may be used to recovery one symbol per second. In some such examples, the ADC 108 samples the RX input 112 to convert the RX input 112 into a digital input signal.

At block 1206, the communication system 100 adjusts an amplitude of the digital input signal to generate a scaled digital input signal. For example, the CAGC 116 may adjust an amplitude of the output from the ADC 108.

At block 1208, the communication system 100 adjusts a gain of the scaled digital input signal to generate an output signal. For example, the DAGC 118 may adjust a gain of the output from the DC removal circuitry 114 with the output from the gain loop circuitry 132.

At block 1210, the communication system 100 generates a decision feedback equalizer (DFE) output based on one or more decisions associated with previous symbol(s). For example, the slicer circuitry 128 may generate the third symbol 150 based on the first symbol 146 and/or the second symbol 148. In some such examples, the DFE 130 may generate a noise error signal, which may be used by the adder circuitry 124 to generate DFE corrected symbols.

At block 1212, the communication system 100 determines whether a timing loop lock is achieved. For example, the sequencer circuitry 142 may determine that the PLL 144 achieved a lock in response to a value of an accumulator of the NCO 140 satisfying a threshold (such as a lock threshold, a timing lock or timing loop lock threshold, etc.). If, at block 1212, the communication system 100 determines that a timing loop lock is not achieved, control proceeds to block 1218 to generate a timing error based on DFE uncorrected symbols. For example, the TED 136 may generate a timing error (such as a timing error signal) based on the first symbol 146. In response to generating the timing error based on DFE uncorrected symbols at block 1218, the communication system 100 adjusts a phase of a sampling operation based on the timing error at block 1220. For example, the NCO 140 may generate the control signal 152 based on the timing error from the TED 136. In some such examples, the phase interpolator circuitry 110 may adjust a phase of the ADC 108 to control the timing at which the ADC 108 samples the RX input 112.

If, at block 1212, the communication system 100 determines that a timing loop lock is not achieved, then, at block 1214, the communication system 100 switches to DFE corrected symbols. For example, the sequencer circuitry 142 may instruct the multiplexer 126 to switch from providing, to the TED 136, a DFE uncorrected symbol (such as the first symbol 146) to providing the TED 136 a DFE corrected symbol (such as the second symbol 148) in response to the PLL 144 achieving a lock.

At block 1216, the communication system 100 generates a timing error based on the DFE corrected symbols. For example, the TED 136 may generate a timing error (such as a timing error signal) based on the second symbol 148 and/or the third symbol 150. In response to generating the timing error based on DFE corrected symbols at block 1216, the communication system 100 adjusts a phase of a sampling operation based on the timing error at block 1220. For example, the NCO 140 may generate the control signal 152 based on the timing error from the TED 136. In some such examples, the phase interpolator circuitry 110 may adjust a phase of the ADC 108 to control the timing at which the ADC 108 samples the RX input 112.

In response to adjusting the phase of the sampling operation based on the timing error at block 1220, the communication system 100 determines whether to continue monitoring the wireline receiver at block 1222. For example, the DSP 102 may determine to obtain another RX input at the wireline receiver to continue data communication between devices (such as a wireline transmitter and the wireline receiver). If, at block 1222, the communication system 100 determines to continue monitoring the wireline receiver, control returns to block 1202, otherwise the example process 1200 of FIG. 12 concludes.

Figure 13:
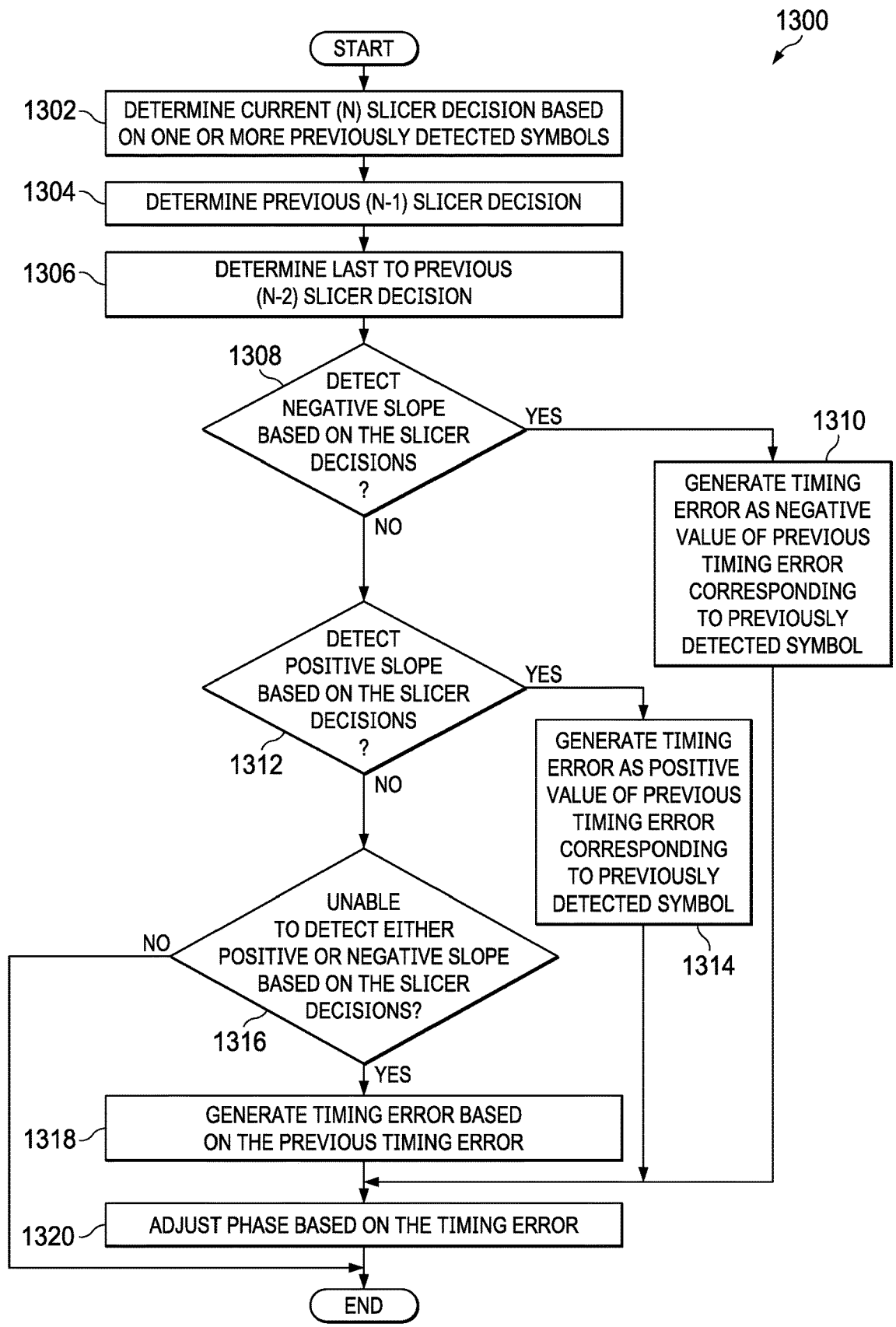
FIG. 13 is a flowchart representative of an example process that may be performed using machine readable instructions and/or hardware configured to implement the example DSP of FIG. 1, and/or, more generally, an example Ethernet PHY device, to carry out the first symbol and timing recovery technique of FIG. 3.

FIG. 13 is a flowchart representative of an example process 1300 that may be performed to carry out a constellation-based TED technique. The example process 1300 of FIG. 13 begins at block 1302, at which the communication system 100 determines a current (N) slicer decision based on one or more previously detected symbols. For example, the slicer circuitry 128 may determine the third symbol 150 as the current slicer decision based on one or more previously detected symbols. In some such examples, the slicer circuitry 128 may determine the current slicer decision as +1.

At block 1304, the communication system 100 determines a previous (N−1) slicer decision. For example, the TED 136 and/or the TED 200 may determine that a previous slicer decision is 0. In some such examples, the previous slicer decision may be stored in memory of the DSP 102, the TED 136, and/or the TED 200. In some examples, the TED 136 and/or the TED 200 may query the slicer circuitry 128 for the previous slicer decision.

At block 1306, the communication system 100 determines a last to previous (N−2) slicer decision. For example, the TED 136 and/or the TED 200 may determine that a previous slicer decision is −1. In some such examples, the previous slicer decision may be stored in memory of the DSP 102, the TED 136, and/or the TED 200. In some examples, the TED 136 and/or the TED 200 may query the slicer circuitry 128 for the previous slicer decision.

At block 1308, the communication system 100 detects whether there is a negative slope based on the slicer decisions. For example, the TED 136 and/or the TED 200 may detect a negative slope based on a N−2, N−1, N symbol transition of +1, 0, −1. In some such examples, the TED 136 and/or the TED 200 may detect a zero-crossing transition (such as a zero-crossing symbol transition) based on the detection of a +1, 0, −1 symbol transition.

If, at block 1308, the communication system 100 detects a negative slope based on the slicer decisions, then, at block 1310, the communication system 100 generates a timing error as a negative value of a previous timing error corresponding to a previously detected symbol. For example, the TED 136 and/or the TED 200 may output a timing error for the current symbol (N) based on a negative value of a timing error of a previously detected symbol (N−1) as described above in connection with FIG. 3. In response to generating the timing error at block 1310, control proceeds to block 1320 to adjust a phase based on the timing error. For example, the phase interpolator circuitry 110, and/or, more generally, the PLL 144, may adjust a phase of the ADC 108 to improve a sampling window in which to detect a symbol of the RX input 112.

If, at block 1308, the communication system 100 does not detect a negative slope based on the slicer decisions, control proceeds to block 1312, to detect whether there is a positive slope based on the slicer decisions. For example, the TED 136 and/or the TED 200 may detect a positive slope based on a N−2, N−1, N symbol transition of −1, 0, +1. In some such examples, the TED 136 and/or the TED 200 may detect a zero-crossing transition (such as a zero-crossing symbol transition) based on the detection of a −1, 0, +1 symbol transition.

If, at block 1312, the communication system 100 detects a positive slope based on the slicer decisions, then, at block 1314, the communication system 100 generates a timing error as a positive value of a previous timing error corresponding to a previously detected symbol. For example, the TED 136 and/or the TED 200 may output a timing error for the current symbol (N) based on a positive value of a timing error of a previously detected symbol (N−1) as described above in connection with FIG. 3. In response to generating the timing error at block 1314, control proceeds to block 1320 to adjust a phase based on the timing error. For example, the phase interpolator circuitry 110, and/or, more generally, the PLL 144, may adjust a phase of the ADC 108 to improve a sampling window in which to detect a symbol of the RX input 112.

If, at block 1312, the communication system 100 does not detect a positive slope based on the slicer decisions, control proceeds to block 1316, to determine whether the communication system 100 is unable to detect either a positive or negative slope based on the slicer decisions. For example, the TED 136 and/or the TED 200 may detect neither a positive slope nor a negative slope based on the slicer decisions. In some such examples, the TED 136 and/or the TED 200 may not detect a zero-crossing transition. In some such examples, the TED 136 and/or the TED 200 may output the previously determined timing error to improve a locking ability of the PLL 144.

If, at block 1316, the communication system 100 is able to detect either a positive or negative slope based on the slicer decisions, the process 1300 of FIG. 13 concludes. If, at block 1316, the communication system 100 is unable to detect either a positive or negative slope based on the slicer decisions, then, at block 1318, the communication system 100 generates a timing error based on the previous timing error. For example, the TED 136 and/or the TED 200 may generate a timing error as the previously determined timing error (such as a timing error for the previously detected symbol). In some such examples, the NCO 140 may output a stored value of an accumulator of the NCO 140 in response to the timing error from the TED 136 and/or the TED 200. In response to generating the timing error at block 1318, control proceeds to block 1320 to adjust a phase based on the timing error. For example, the phase interpolator circuitry 110, and/or, more generally, the PLL 144, may adjust a phase of the ADC 108 to improve a sampling window in which to detect a symbol of the RX input 112. In response to adjusting the phase based on the timing error, the process 1300 of FIG. 13 concludes.

Figure 14:
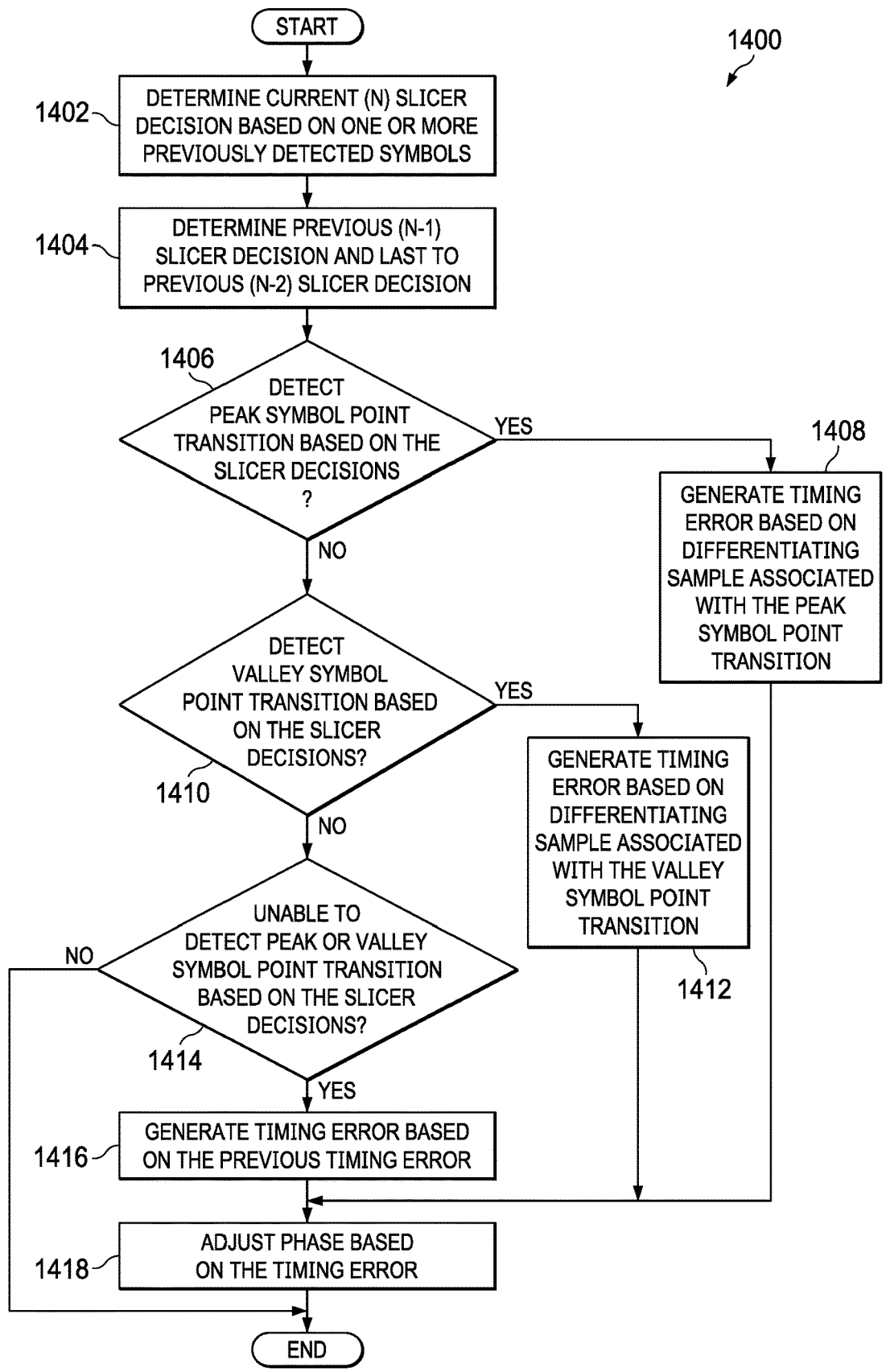
FIG. 14 is a flowchart representative of an example process that may be performed using machine readable instructions that can be executed and/or hardware configured to implement the example DSP of FIG. 1, and/or, more generally, an example Ethernet PHY device, to carry out the second symbol and timing recovery technique of FIG. 4.

FIG. 14 is a flowchart representative of an example process 1400 that may be performed to carry out a pseudo-ML TED technique. The example process 1400 of FIG. 14 begins at block 1402, at which the communication system 100 determines a current (N) slicer decision based on one or more previously detected symbols. For example, the slicer circuitry 128 may determine the third symbol 150 as the current slicer decision based on one or more previously detected symbols. In some such examples, the slicer circuitry 128 may determine the current slicer decision as −1.

At block 1404, the communication system 100 determines a previous (N−1) slicer decision and a last to previous (N−2) slicer decision. For example, the TED 136 and/or the TED 200 may determine that a previous slicer decision is +1 and a last to previous slicer decision is −1. In some such examples, the previous slicer decision and/or the last to previous slicer decision may be stored in memory of the DSP 102, the TED 136, and/or the TED 200. In some examples, the TED 136 and/or the TED 200 may query the slicer circuitry 128 for the previous slicer decision and/or the last to previous slicer decision.

At block 1406, the communication system 100 detects whether there is a peak symbol point transition based on the slicer decisions. For example, the TED 136 and/or the TED 200 may detect a peak symbol point transition based on a N−2, N−1, N symbol transition of −1, +1, −1.

If, at block 1406, the communication system 100 detects a peak symbol point transition based on the slicer decisions, then, at block 1408, the communication system 100 generates a timing error based on a differentiating sample associated with the peak symbol point transition. For example, the TED 136 and/or the TED 200 may be a differentiator to generate a timing error for the current symbol (N) as described above in connection with FIG. 4. In some such examples, the differentiator may carry out the second pseudocode 404 of FIG. 4. In response to generating the timing error at block 1408, control proceeds to block 1418 to adjust a phase based on the timing error. For example, the phase interpolator circuitry 110, and/or, more generally, the PLL 144, may adjust a phase of the ADC 108 to improve a sampling window in which to detect a symbol of the RX input 112.

If, at block 1406, the communication system 100 does not detect a peak symbol point transition based on the slicer decisions, control proceeds to block 1410, to detect whether there is a valley symbol point transition based on the slicer decisions. For example, the TED 136 and/or the TED 200 may detect a valley symbol point transition based on a N−2, N−1, N symbol transition of +1, −1, +1.

If, at block 1410, the communication system 100 detects a valley symbol point transition based on the slicer decisions, then, at block 1412, the communication system 100 generates a timing error based on a differentiating sample associated with the valley symbol point transition. For example, the TED 136 and/or the TED 200 may be a differentiator to generate a timing error for the current symbol (N) as described above in connection with FIG. 4. In some such examples, the differentiator may carry out the second pseudocode 404 of FIG. 4. In response to generating the timing error at block 1412, control proceeds to block 1418 to adjust a phase based on the timing error. For example, the phase interpolator circuitry 110, and/or, more generally, the PLL 144, may adjust a phase of the ADC 108 to improve a sampling window in which to detect a symbol of the RX input 112.

If, at block 1410, the communication system 100 does not detect a valley symbol point transition based on the slicer decisions, control proceeds to block 1414 to determine whether the communication system 100 is unable to detect either a peak or valley symbol point transition based on the slicer decisions. For example, the TED 136 and/or the TED 200 may detect neither a peak symbol point transition nor a valley symbol point transition based on the slicer decisions. In some such examples, the TED 136 and/or the TED 200 may output the previously determined timing error to improve a locking ability of the PLL 144.

If, at block 1414, the communication system 100 is able to detect either a peak or valley symbol point transition based on the slicer decisions, the process 1400 of FIG. 14 concludes. If, at block 1414, the communication system 100 is unable to detect either a peak or valley symbol point transition based on the slicer decisions, then, at block 1416, the communication system 100 generates a timing error based on the previous timing error. For example, the TED 136 and/or the TED 200 may generate a timing error as the previously determined timing error (such as a timing error for the previously detected symbol). In some such examples, the NCO 140 may output a stored value of an accumulator of the NCO 140 in response to the timing error from the TED 136 and/or the TED 200. In response to generating the timing error at block 1416, control proceeds to block 1418 to adjust a phase based on the timing error. For example, the phase interpolator circuitry 110, and/or, more generally, the PLL 144, may adjust a phase of the ADC 108 to improve a sampling window in which to detect a symbol of the RX input 112. In response to adjusting the phase based on the timing error, the process 1400 of FIG. 14 concludes.

Figure 15:
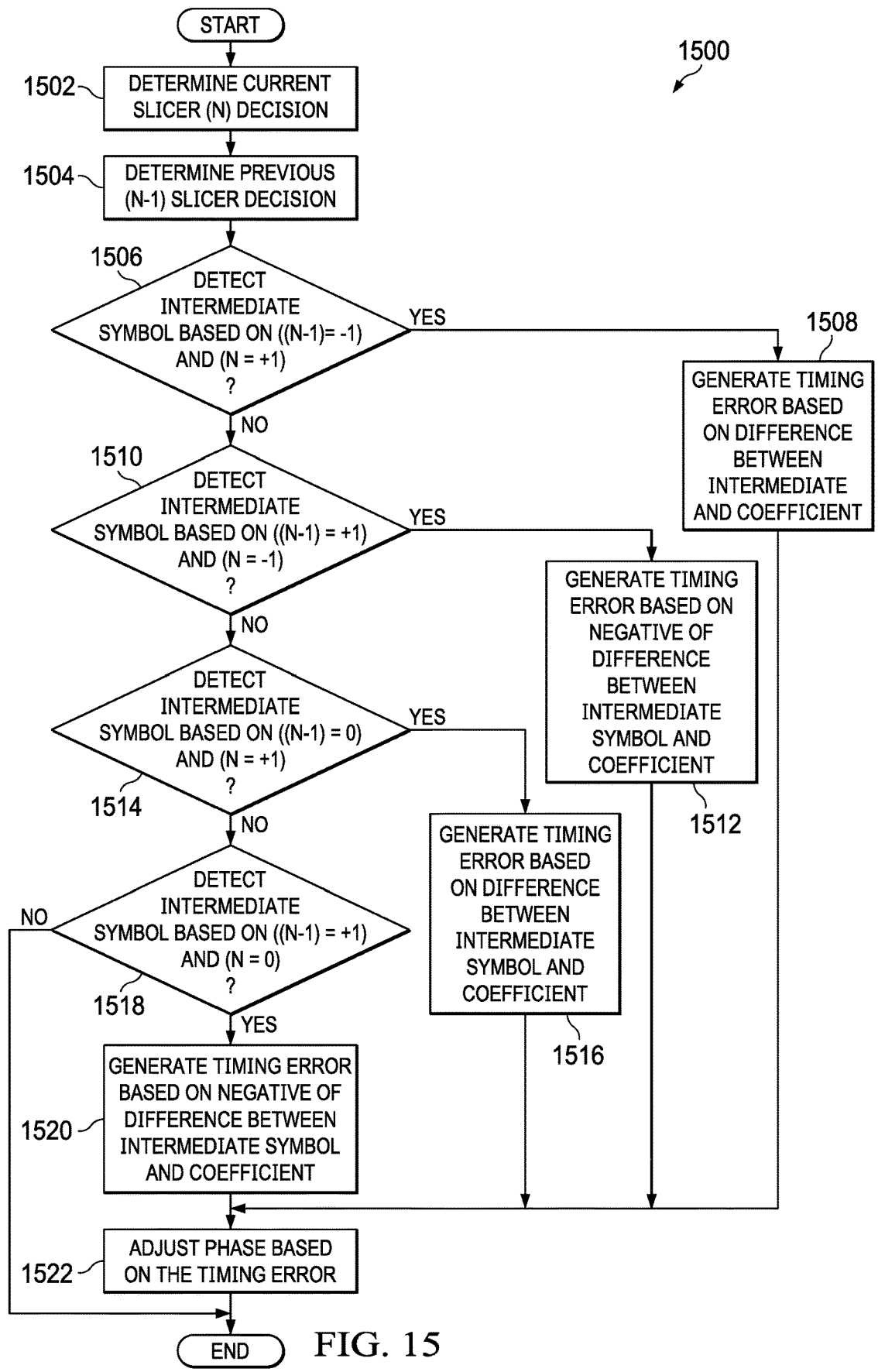
FIG. 15 is a flowchart representative of an example process that may be performed using machine readable instructions that can be executed and/or hardware configured to implement the example DSP of FIG. 1, and/or, more generally, an example Ethernet PHY device, to carry out the third symbol and timing recovery technique of FIG. 5.

FIG. 15 is a flowchart representative of an example process 1500 that may be performed to carry out a mid-symbol TED technique. The example process 1500 of FIG. 15 begins at block 1502, at which the communication system 100 determines a current (N) slicer decision based on one or more previously detected symbols. For example, the slicer circuitry 128 may determine the third symbol 150 as the current slicer decision based on one or more previously detected symbols. In some such examples, the slicer circuitry 128 may determine the current slicer decision as −1.

At block 1504, the communication system 100 determines a previous (N−1) slicer decision. For example, the TED 136 and/or the TED 200 may determine that a previous slicer decision is 0. In some such examples, the previous slicer decision may be stored in memory of the DSP 102, the TED 136, and/or the TED 200. In some examples, the TED 136 and/or the TED 200 may query the slicer circuitry 128 for the previous slicer decision.

At block 1506, the communication system 100 detects whether there is an intermediate symbol based on ((N−1)=−1) and (N=+1) based on the slicer decisions. For example, the TED 136 and/or the TED 200 may detect the first symbol position 508 based on a N−1, N symbol transition of −1, +1. If, at block 1506, the communication system 100 detects an intermediate symbol based on ((N−1)=−1) and (N=+1), then, at block 1508, the communication system 100 generates a timing error based on a difference between the mid-symbol and a coefficient. For example, the TED 136 and/or the TED 200 may generate the timing error based on the pseudocode 502 of FIG. 5. In response to generating the timing error based on the difference between the intermediate and the coefficient at block 1508, control proceeds to block 1522 to adjust a phase based on the timing error. For example, the phase interpolator circuitry 110, and/or, more generally, the PLL 144, may adjust a phase (such as increase or decrease a phase) of the ADC 108 to adjust and/or otherwise shift a sampling window in which to detect a symbol of the RX input 112.

If, at block 1506, the communication system 100 does not detect an intermediate symbol based on ((N−1)=−1) and (N=+1), the communication system 100 detects whether there is an intermediate symbol based on ((N−1)=+1) and (N=−1) at block 1510. For example, the TED 136 and/or the TED 200 may detect an intermediate symbol based on a N−1, N symbol transition of +1, −1. If, at block 1510, the communication system 100 detects an intermediate symbol based on ((N−1)=+1) and (N=−1), then, at block 1512, the communication system 100 generates a timing error based on a difference between the intermediate and a coefficient. For example, the TED 136 and/or the TED 200 may generate the timing error based on the pseudocode 502 of FIG. 5. In some such examples, the coefficient may be 0. In response to generating the timing error based on the difference between the intermediate symbol and the coefficient at block 1512, control proceeds to block 1522 to adjust a phase based on the timing error. For example, the phase interpolator circuitry 110, and/or, more generally, the PLL 144, may adjust a phase (such as increase or decrease a phase) of the ADC 108 to adjust and/or otherwise shift a sampling window in which to detect a symbol of the RX input 112.

If, at block 1510, the communication system 100 does not detect an intermediate symbol based on ((N−1)=+1) and (N=−1), the communication system 100 detects whether there is an intermediate symbol based on ((N−1)=0) and (N=+1) at block 1514. For example, the TED 136 and/or the TED 200 may detect an intermediate or mid-symbol based on a N−1, N symbol transition of 0, +1. If, at block 1514, the communication system 100 detects an intermediate symbol based on ((N−1)=0) and (N=+1), then, at block 1516, the communication system 100 generates a timing error based on a difference between the intermediate symbol and a coefficient. For example, the TED 136 and/or the TED 200 may generate the timing error based on the pseudocode 502 of FIG. 5. In response to generating the timing error based on the difference between the intermediate symbol and the coefficient at block 1516, control proceeds to block 1522 to adjust a phase based on the timing error. For example, the phase interpolator circuitry 110, and/or, more generally, the PLL 144, may adjust a phase (such as increase or decrease a phase) of the ADC 108 to adjust and/or otherwise shift a sampling window in which to detect a symbol of the RX input 112.

If, at block 1514, the communication system 100 does not detect an intermediate symbol based on ((N−1)=0) and (N=+1), the communication system 100 detects whether there is an intermediate symbol based on ((N−1)=+1) and (N=0) at block 1518. For example, the TED 136 and/or the TED 200 may detect an intermediate symbol based on a N−1, N symbol transition of +1, 0. If, at block 1518, the communication system 100 detects an intermediate symbol based on ((N−1)=+1) and (N=0), then, at block 1520, the communication system 100 generates a timing error based on a difference between the intermediate symbol and a coefficient. For example, the TED 136 and/or the TED 200 may generate the timing error based on the pseudocode 502 of FIG. 5. In response to generating the timing error based on the difference between the intermediate symbol and the coefficient at block 1520, control proceeds to block 1522 to adjust a phase based on the timing error. For example, the phase interpolator circuitry 110, and/or, more generally, the PLL 144, may adjust a phase (such as increase or decrease a phase) of the ADC 108 to adjust and/or otherwise shift a sampling window in which to detect a symbol of the RX input 112. In response to adjusting the phase based on the timing error at block 1522, the process 1500 of FIG. 15 concludes.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

Example systems, methods, apparatus, and articles of manufacture described herein include symbol and timing recovery techniques to achieve improved timing loop locking performance irrespective of channel length or ISI present in the channel. Example systems, methods, apparatus, and articles of manufacture described herein include a constellation-based TED technique to determine a timing error based on zero-crossing transitions. Example systems, methods, apparatus, and articles of manufacture described herein include a pseudo-ML TED technique to determine a timing error based on detections of peak or valley symbol transitions. Example systems, methods, apparatus, and articles of manufacture described herein include a mid-symbol TED technique to determine a timing error based on interpolations of samples to the middle point of the symbol to compare with the expected midpoint. Example systems, methods, apparatus, and articles of manufacture described herein include a combination of the constellation-based TED technique and the pseudo-ML TED technique for improved TED gain as both techniques use complimentary symbol transitions. Example systems, methods, apparatus, and articles of manufacture described herein include a differentiator to carry out a pseudo-ML TED technique utilizing one or more filters. Example systems, methods, apparatus, and articles of manufacture described herein include carrying out the interpolation operations of a pseudo-ML TED technique with one or more filters. Example systems, methods, apparatus, and articles of manufacture described herein include symbol and timing recovery techniques that cause TEDs to pass previous timing error values when a designated or expected symbol transition is not detected. Advantageously, the symbol and timing recovery techniques described herein may be carried out by any wireline receiver, transmitter, transceiver, etc., (such as an Ethernet PHY device) to achieve reduced hardware costs and power consumption.

Example methods, apparatus, systems, and articles of manufacture for symbol and timing recovery and related methods are described herein. Further examples and combinations thereof include the following:

Example 1 includes an apparatus comprising a feed forward equalizer (FFE) with a FFE output, adder circuitry with a first adder input, a second adder input, and a first adder output, the first adder input coupled to the FFE output, a multiplexer (MUX) with a first MUX input, a second MUX input, and a MUX output, the first MUX input coupled to the first adder output, the second MUX input coupled to the FFE output, a decision feedback equalizer (DFE) with a DFE output coupled to the second adder input, and a timing error detector (TED) with a first TED input coupled to the MUX output.

Example 2 includes the apparatus of example 1, wherein the adder circuitry has a second adder output, the DFE has a DFE input, the TED has a second TED input, and further including slicer circuitry with a slicer input, a first slicer output, and a second slicer output, the slicer input coupled to the second adder output, the first slicer output coupled to the DFE input, the second slicer output coupled to the second TED input.

Example 3 includes the apparatus of example 1, wherein the MUX is a first MUX, the MUX output is a first MUX output, the DFE has a first DFE output and a second DFE output, and the TED includes a second MUX with a third MUX input, a fourth MUX input, a fifth MUX input, a second MUX output, the third MUX input coupled to the first DFE output, the fourth MUX input coupled to the second DFE output, and a latch with a latch input and a latch output, the latch input coupled to the second MUX output, the latch output coupled to the fifth MUX input.

Example 4 includes the apparatus of example 3, wherein the first MUX has a first MUX control input, the second MUX has a second MUX control input, and further including sequencer circuitry with a first sequencer output coupled to the first MUX control input and a second sequencer output coupled to the second MUX control input.

Example 5 includes the apparatus of example 3, wherein the second MUX has a third MUX output, and further including a phase-locked loop (PLL) with a PLL input coupled to the third MUX output.

Example 6 includes the apparatus of example 1, wherein the TED has a TED output, and further including a loop filter with a loop filter input and a loop filter output, the loop filter input coupled to the TED output, a numerically-controlled oscillator (NCO) with an NCO input and an NCO output, the NCO input coupled to the loop filter output, and a phase detector with a phase detector input coupled to the NCO output.

Example 7 includes the apparatus of example 6, wherein the phase detector has a phase detector output, and further including an analog-to-digital converter (ADC) with a first ADC input and a second ADC input, the first ADC input coupled to the phase detector output, a low-pass filter with a first filter input and a first filter output, the first filter output coupled to the second ADC input, a high-pass filter with a second filter input and a second filter output, the second filter output coupled to the first filter input, and a terminal coupled to the second filter input.

Example 8 includes the apparatus of example 1, wherein the FFE has an FFE input, the TED has a TED output, and further including a phase-locked loop (PLL) with a PLL input and a PLL output, the PLL input coupled to the TED output, an analog-to-digital converter (ADC) with an ADC input and an ADC output, the ADC input coupled to the PLL output, direct current (DC) removal circuitry with a first input and a first output, the first input coupled to the ADC output, digital automatic gain control (AGC) circuitry with a second input and a second output, the second input coupled to the first output, and de-equalizer circuitry with a third input and a third output, the third input coupled to the second output, the third output coupled to the FFE input.

Example 9 includes a receiver operable to receive a communication signal including a plurality of symbols, the receiver comprising memory including instructions stored in the memory, a processor coupled to the memory and operable to execute the instructions to at least detect one or more first symbols of the plurality of the symbols in the communication signal based on a first phase of a sampling clock, determine a second symbol of the plurality of the symbols in the communication signal based on the one or more first symbols, generate a voltage corresponding to a timing phase offset, the voltage based on the second symbol, in response to the voltage satisfying a threshold, generate a control signal based on the second symbol, and adjust the first phase to a second phase based on the control signal.

Example 10 includes the receiver of example 9, wherein the processor is to identify a timing loop lock based on the voltage satisfying the threshold.

Example 11 includes the receiver of example 9, wherein the one or more first symbols include a third symbol, a fourth symbol, and a fifth symbol, and the processor is to determine that the third symbol corresponds to a positive one value, determine that the fourth symbol corresponds to a zero value, determine that the fifth symbol corresponds to a negative one value, and detect a zero-crossing transition based on the determinations.

Example 12 includes the receiver of example 11, wherein the third symbol is a current decision of slicer circuitry, the timing phase offset is a second timing phase offset, and the processor is to, in response to the detection of the zero-crossing transition, determine the second symbol as a product of a sign of the current decision and a first timing phase offset corresponding to the fourth symbol.

Example 13 includes the receiver of example 9, wherein the one or more first symbols include a third symbol, a fourth symbol, and a fifth symbol, and the processor is to determine that the third symbol corresponds to a negative one value, determine that the fourth symbol corresponds to a zero value, determine that the fifth symbol corresponds to a positive one value, and detect a zero-crossing transition based on the determinations.

Example 14 includes the receiver of example 13, wherein the third symbol is a current decision of slicer circuitry, the timing phase offset is a second timing phase offset, and the processor is to, in response to the detection of the zero-crossing transition, determine the second symbol as a product of a sign of the current decision and a first timing phase offset corresponding to the fourth symbol.

Example 15 includes the receiver of example 9, wherein the processor is to determine values for respective ones of the one or more first symbols, and in response to a determination that a zero-crossing transition is not detected based on the values, determine the second symbol as a zero value.

Example 16 includes the receiver of example 9, wherein the timing phase offset is a second timing phase offset determined at a second time, and the processor is to determine values for respective ones of the one or more first symbols, and in response to a determination that a zero-crossing transition is not detected based on the values, determine the second symbol as a first timing phase offset determined at a first time prior to the second time.

Example 17 includes the receiver of example 9, wherein the one or more first symbols include a third symbol, a fourth symbol, and a fifth symbol, and the processor is to determine that the third symbol corresponds to a negative one value, determine that the fourth symbol corresponds to a positive one value, determine that the fifth symbol corresponds to a negative one value, and detect a peak symbol point transition based on the determinations.

Example 18 includes the receiver of example 17, wherein the third symbol is a current decision of slicer circuitry, the timing phase offset is a second timing phase offset, and the processor is to, in response to the detection of the peak symbol point transition determine a difference between a first differentiator output and a second differentiator output, and determine the second symbol as a product of the difference and a first timing phase offset corresponding to the fourth symbol.

Example 19 includes the receiver of example 9, wherein the one or more first symbols include a third symbol, a fourth symbol, and a fifth symbol, and the processor is to determine that the third symbol corresponds to a positive one value, determine that the fourth symbol corresponds to a negative one value, determine that the fifth symbol corresponds to a positive one value, and detect a peak symbol point transition based on the determinations.

Example 20 includes the receiver of example 19, wherein the third symbol is a current decision of slicer circuitry, the timing phase offset is a second timing phase offset, and the processor is to, in response to the detection of the peak symbol point transition determine a difference between a first differentiator output and a second differentiator output, and determine the second symbol as a product of a negative one value, the difference, and a first timing phase offset corresponding to the fourth symbol.

Example 21 includes the receiver of example 9, wherein the one or more first symbols include a third symbol and a fourth symbol, and the processor is to determine that the third symbol corresponds to a first value, determine that the fourth symbol corresponds to a second value, detect a fifth symbol having a third value between the first value and the second value, and determine the second symbol based on a difference between the third value and a fourth value, the fourth value based on half of a sum of the first value and the second value.

Example 22 includes at least one non-transitory computer readable storage medium comprising instructions that, when executed, cause a processor to at least detect one or more first symbols of a digital signal based on a first phase of a sampling clock, determine a second symbol based on the one or more first symbols, generate a voltage corresponding to a timing phase offset, the voltage based on the second symbol, in response to the voltage satisfying a threshold, generate a control signal based on the second symbol, and adjust the first phase to a second phase based on the control signal.

Example 23 includes the at least one non-transitory computer readable storage medium of example 22, wherein the one or more first symbols include a third symbol and a fourth symbol, the timing phase offset is a second timing phase offset, and the instructions, when executed, cause the processor to detect a zero-crossing transition of the digital signal based on the one or more first symbols, and in response to a detection of the zero-crossing transition, determine the second symbol as a product of a sign of the third symbol and a first timing offset corresponding to the fourth symbol.

Example 24 includes the at least one non-transitory computer readable storage medium of example 22, wherein the one or more first symbols include a third symbol, a fourth symbol, and a fifth symbol, the timing phase offset is a second timing phase offset, and the instructions, when executed, cause the processor to detect a peak or a valley symbol point transition of the digital signal based on the one or more first symbols, in response to a detection of the peak or the valley symbol point transition determine a difference between a first differentiator output associated with the third symbol and a second differentiator output associated with the fifth symbol, and determine the second symbol as a product of the difference and a first timing phase offset corresponding to the fourth symbol.

Example 25 includes the at least one non-transitory computer readable storage medium of example 22, wherein the one or more first symbols include a third symbol, a fourth symbol, and a fifth symbol, the timing phase offset is a second timing phase offset, and the instructions, when executed, cause the processor to determine that the fourth symbol is between the third symbol and the fifth symbol, and determine the second symbol based on a difference between a first value corresponding to the fourth symbol and a second value, the second value based on half of a sum of a third value corresponding to the third symbol and a fourth value corresponding to the fifth symbol.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Unless otherwise stated, "about," "approximately," or "substantially" preceding a value means+/−10 percent of the stated value.

Modifications are possible in the described embodiments, and other embodiments are possible, within the scope of the claims.

What is claimed is:

1. A receiver operable to receive a communication signal including a plurality of symbols, the receiver comprising:
    memory including instructions stored in the memory;
    a processor coupled to the memory and operable to execute the instructions to at least:
        detect one or more first symbols of the plurality of the symbols in the communication signal based on a first phase of a sampling clock;
        determine a second symbol of the plurality of the symbols in the communication signal based on the one or more first symbols;
        generate a voltage corresponding to a timing phase offset, the voltage based on the second symbol;
        in response to the voltage satisfying a threshold, generate a control signal based on the second symbol; and
        adjust the first phase to a second phase based on the control signal.

2. The receiver of claim 1, wherein the processor is to identify a timing loop lock based on the voltage satisfying the threshold.

3. The receiver of claim 1, wherein the one or more first symbols include a third symbol, a fourth symbol, and a fifth symbol, and the processor is to:
    determine that the third symbol corresponds to a positive one value;
    determine that the fourth symbol corresponds to a zero value;
    determine that the fifth symbol corresponds to a negative one value; and
    detect a zero-crossing transition based on the determinations.

4. The receiver of claim 3, wherein the third symbol is a current decision of slicer circuitry, the timing phase offset is a second timing phase offset, and the processor is to, in response to the detection of the zero-crossing transition, determine the second symbol as a product of a sign of the current decision and a first timing phase offset corresponding to the fourth symbol.

5. The receiver of claim 1, wherein the one or more first symbols include a third symbol, a fourth symbol, and a fifth symbol, and the processor is to:
    determine that the third symbol corresponds to a negative one value;
    determine that the fourth symbol corresponds to a zero value;
    determine that the fifth symbol corresponds to a positive one value; and
    detect a zero-crossing transition based on the determinations.

6. The receiver of claim 5, wherein the third symbol is a current decision of slicer circuitry, the timing phase offset is a second timing phase offset, and the processor is to, in response to the detection of the zero-crossing transition, determine the second symbol as a product of a sign of the current decision and a first timing phase offset corresponding to the fourth symbol.

7. The receiver of claim 1, wherein the processor is to:
    determine values for respective ones of the one or more first symbols; and
    in response to a determination that a zero-crossing transition is not detected based on the values, determine the second symbol as a zero value.

8. The receiver of claim 1, wherein the timing phase offset is a second timing phase offset determined at a second time, and the processor is to:
    determine values for respective ones of the one or more first symbols; and
    in response to a determination that a zero-crossing transition is not detected based on the values, determine the second symbol as a first timing phase offset determined at a first time prior to the second time.

9. The receiver of claim 1, wherein the one or more first symbols include a third symbol, a fourth symbol, and a fifth symbol, and the processor is to:

determine that the third symbol corresponds to a negative one value;

determine that the fourth symbol corresponds to a positive one value;

determine that the fifth symbol corresponds to a negative one value; and detect a peak symbol point transition based on the determinations.

10. The receiver of claim 9, wherein the third symbol is a current decision of slicer circuitry, the timing phase offset is a second timing phase offset, and the processor is to, in response to the detection of the peak symbol point transition:

determine a difference between a first differentiator output and a second differentiator output; and determine the second symbol as a product of the difference and a first timing phase offset corresponding to the fourth symbol.

11. The receiver of claim 1, wherein the one or more first symbols include a third symbol, a fourth symbol, and a fifth symbol, and the processor is to:

determine that the third symbol corresponds to a positive one value;

determine that the fourth symbol corresponds to a negative one value;

determine that the fifth symbol corresponds to a positive one value; and detect a peak symbol point transition based on the determinations.

12. The receiver of claim 11, wherein the third symbol is a current decision of slicer circuitry, the timing phase offset is a second timing phase offset, and the processor is to, in response to the detection of the peak symbol point transition:

determine a difference between a first differentiator output and a second differentiator output; and determine the second symbol as a product of a negative one value, the difference, and a first timing phase offset corresponding to the fourth symbol.

13. The receiver of claim 1, wherein the one or more first symbols include a third symbol and a fourth symbol, and the processor is to:

determine that the third symbol corresponds to a first value;

determine that the fourth symbol corresponds to a second value;

detect a fifth symbol having a third value between the first value and the second value; and determine the second symbol based on a difference between the third value and a fourth value, the fourth value based on half of a sum of the first value and the second value.

14. At least one non-transitory computer readable storage medium comprising instructions that, when executed, cause a processor to at least:

detect one or more first symbols of a digital signal based on a first phase of a sampling clock;

determine a second symbol based on the one or more first symbols;

generate a voltage corresponding to a timing phase offset, the voltage based on the second symbol;

in response to the voltage satisfying a threshold, generate a control signal based on the second symbol; and adjust the first phase to a second phase based on the control signal.

15. The at least one non-transitory computer readable storage medium of claim 14, wherein the one or more first symbols include a third symbol and a fourth symbol, the timing phase offset is a second timing phase offset, and the instructions, when executed, cause the processor to:

detect a zero-crossing transition of the digital signal based on the one or more first symbols; and in response to a detection of the zero-crossing transition, determine the second symbol as a product of a sign of the third symbol and a first timing offset corresponding to the fourth symbol.

16. The at least one non-transitory computer readable storage medium of claim 14, wherein the one or more first symbols include a third symbol, a fourth symbol, and a fifth symbol, the timing phase offset is a second timing phase offset, and the instructions, when executed, cause the processor to:

detect a peak or a valley symbol point transition of the digital signal based on the one or more first symbols;

in response to a detection of the peak or the valley symbol point transition:

determine a difference between a first differentiator output associated with the third symbol and a second differentiator output associated with the fifth symbol; and determine the second symbol as a product of the difference and a first timing phase offset corresponding to the fourth symbol.

17. The at least one non-transitory computer readable storage medium of claim 14, wherein the one or more first symbols include a third symbol, a fourth symbol, and a fifth symbol, the timing phase offset is a second timing phase offset, and the instructions, when executed, cause the processor to:

determine that the fourth symbol is between the third symbol and the fifth symbol; and determine the second symbol based on a difference between a first value corresponding to the fourth symbol and a second value, the second value based on half of a sum of a third value corresponding to the third symbol and a fourth value corresponding to the fifth symbol.

* * * * *